(12) United States Patent
Stephens

(10) Patent No.: US 6,763,108 B1
(45) Date of Patent: Jul. 13, 2004

(54) APPARATUS AND METHOD FOR LINE PAIR TESTING AND FAULT DIAGNOSTICS

(75) Inventor: Charles D. Stephens, Dallas, TX (US)

(73) Assignee: Communications Technology Corp., Everett, WA (US)

( * ) Notice: Subject to any disclaimer, the term of this patent is extended or adjusted under 35 U.S.C. 154(b) by 668 days.

(21) Appl. No.: 09/707,138

(22) Filed: Nov. 6, 2000

Related U.S. Application Data

(62) Division of application No. 08/778,816, filed on Jan. 3, 1997, now Pat. No. 6,144,721.
(60) Provisional application No. 60/009,659, filed on Jan. 5, 1996.

(51) Int. Cl.⁷ ............................. H04M 1/00; H04M 9/00
(52) U.S. Cl. ...................... 379/399.01; 379/21; 379/24; 379/32.01
(58) Field of Search ............................... 379/1.01, 9.06, 379/21, 24, 27.01, 27.06, 32.01, 399.01; 324/520, 534, 605, 606

(56) References Cited

U.S. PATENT DOCUMENTS

| | | | | |
|---|---|---|---|---|
| 3,693,080 A | * | 9/1972 | Ross et al. | 324/638 |
| 3,751,606 A | * | 8/1973 | Kaiser, Jr. | 379/22.03 |
| 3,904,839 A | * | 9/1975 | Peoples | 379/22.03 |
| 4,001,559 A | * | 1/1977 | Osborne et al. | 714/714 |
| 4,130,794 A | * | 12/1978 | Cox | 324/538 |
| 4,245,346 A | * | 1/1981 | Grady et al. | 380/31 |
| 4,307,267 A | * | 12/1981 | Peoples | 324/605 |
| 4,339,791 A | * | 7/1982 | Mitchell | 363/41 |
| 4,486,627 A | * | 12/1984 | Beeman et al. | 324/649 |
| 4,620,069 A | * | 10/1986 | Godwin et al. | 379/22.02 |
| 4,630,228 A | * | 12/1986 | Tarczy-Hornoch et al. | 702/59 |
| 4,694,482 A | * | 9/1987 | Reesor et al. | 379/27.01 |
| 5,400,346 A | * | 3/1995 | Clayton et al. | 714/712 |
| 5,404,388 A | * | 4/1995 | Eu | 379/24 |
| 5,436,953 A | * | 7/1995 | Nilson | 379/27.01 |
| 5,465,287 A | * | 11/1995 | Egozi | 379/22.02 |
| 5,473,244 A | * | 12/1995 | Libove et al. | 324/126 |
| 5,521,959 A | * | 5/1996 | Walsworth et al. | 379/27.04 |
| 5,864,602 A | * | 1/1999 | Needle | 379/22.02 |
| 5,881,130 A | * | 3/1999 | Zhang | 379/27.08 |

* cited by examiner

Primary Examiner—Binh Tieu
(74) Attorney, Agent, or Firm—Crutsinger & Booth

(57) ABSTRACT

A line pair testing and fault diagnostic apparatus implementing three-terminal measurement techniques using a multiple frequency source waveform transmission to propagate a reflected waveform. The apparatus implements a microcomputer circuit executing a program. The program has frequency domain analysis algorithms to process the reflected waveform to provide a craftsperson with the electrical characteristic data of a line pair to inform the craftsperson the existence of a line pair fault and the location of the fault in the line pair. The apparatus implements relays for switching between several diagnostics circuits within the apparatus for providing the craftsperson with numerous methods and techniques for troubleshooting a line pair.

7 Claims, 30 Drawing Sheets

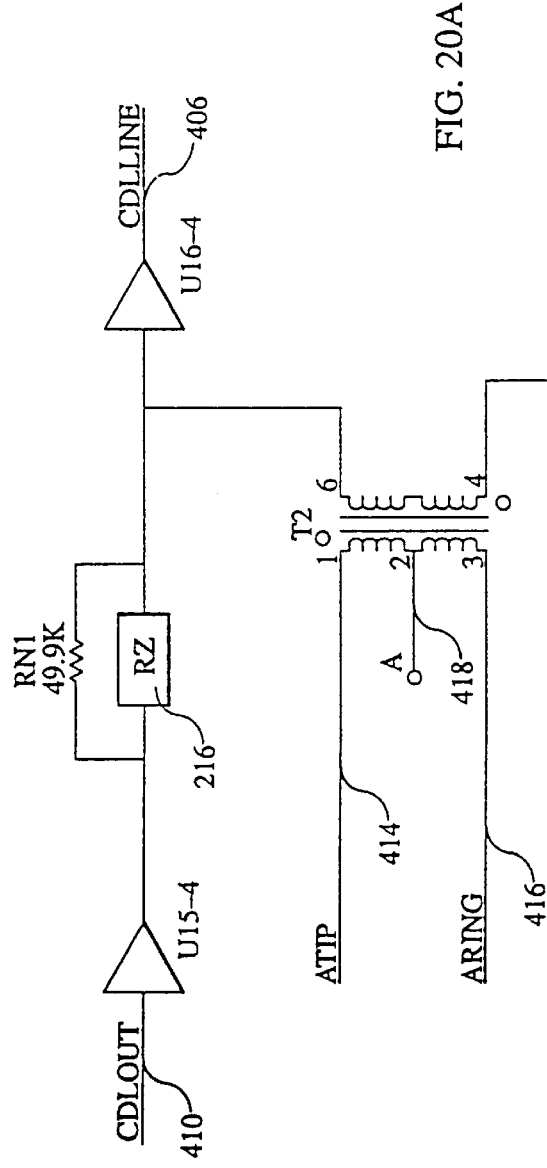
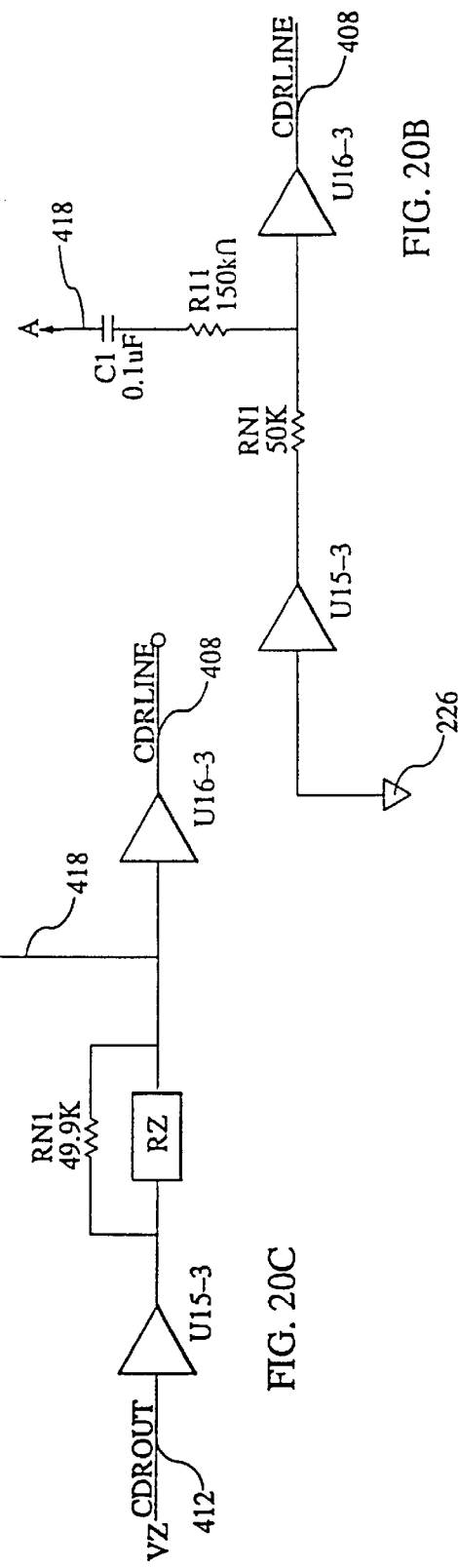
FIG. 20A
FIG. 20B
FIG. 20C

APPARATUS AND METHOD FOR LINE PAIR TESTING AND FAULT DIAGNOSTICS

CROSS REFERENCE TO RELATED APPLICATION

This is a division of application Ser. No. 08/778,816 filed Jan. 3, 1997, now U.S. Pat. No. 6,144,721 entitled "APPARATUS AND METHOD FOR LINE PAIR TESTING AND FAULT DIAGNOSTICS," the disclosure of which is incorporated herein by reference. This application claims the benefit of the filing date of provisional application Ser. No. 60/009,659 filed Jan. 5, 1996, entitled "APPARATUS AND METHOD FOR LINE PAIR TESTING AND FAULT DIAGNOSTICS."

TECHNICAL FIELD

A microfiche appendix having one page of microfiche with a total of 86 frames of a computer program constitutes part of the specification of this invention pursuant to 37 C. F. R. 1.77 and 1.96.

The present invention relates to telephone system test equipment and more particularly to equipment operable by a single craftsperson or technician to obtain telephone measurements comprising line pair resistances, capacitances and voltages and to detect and locate faults in a telephone line pair.

BACKGROUND OF THE INVENTION

Telephone line pairs can have faults caused by any number of factors. A line fault can result from repair or construction around the lines such that a line pair is broken or shorted together. These types of faults are readily identifiable and rarely is any form of test equipment required to locate the fault.

More elusive faults are caused by improper splices causing a condition known as a "split," or by improperly terminating a line pair. A fault can also result from natural influences such as moisture seeping into the line pair causing corrosion, rodents chewing through the line pair, or lightning strikes on the cable. Test equipment is needed for detecting these line pair faults.

Typically a craftsperson is sent into the field to analyze faulty telephone line pairs. The system test equipment used is often bulky and difficult to handle by a typical craftsperson. The usefulness of such test equipment is further limited because only one test function out of many essential fault analysis or location techniques is available in a single piece of test equipment. Therefore, to effectively troubleshoot a line pair, the craftsperson must bring with him a miscellaneous collection of diagnostic equipment.

Compounding an already onerous task, each piece of test equipment is functionally different and has its own nuances. The craftsperson must intimately know the intricacies of each piece to effectively troubleshoot the line pair in the field. A large learning curve and years of experience are required to adequately train craftspersons before they become sufficiently familiar with each piece equipment.

When analyzing a line pair a craftsperson verifies whether the line pair's characteristics of capacitance, resistance, and voltage parameters are within industry standards. A line pair has a tip leg, a ring leg and a ground leg. The capacitance parameters comprise those capacitance values from ring-to-tip, ring-to-ground and tip-to-ground, or $C_{RT}$, $C_{RG}$ and $C_{TG}$, respectively. A line pair's capacitance value is largely a function of the dielectric used and the amount of twist in the line pair. A line pair's resistance values, $R_{TIP}$, $R_{RING}$ and $R_{GND}$, respectively, are functions of wire gauge. That is, the lower the wire gauge, the greater the thickness of the wire, and therefore the lower the resistance.

Prior meters typically implement a one-dimensional analysis which merely measures the resistance of the line pair using a direct current ("DC") method or simply measure the capacitance of the line pair using an alternating current ("AC") method using a time domain analysis based on Laplace transforms. A barrier to effective use of the DC method is the presence of series capacitance effects between the legs of a line pair. Because the capacitance acts as a DC filter, conventional meters cannot detect a series resistance fault caused by, for example, a bad connector. Thus, another piece of test equipment would have to be used to fully diagnose the line pair. More often than not, the craftsperson would have to terminate the opposite end of the line pair to perform these additional tests, requiring the craftsperson to travel to the far end of the line pair and to travel back to complete the tests.

Some test equipment provides longitudinal balance tests that allow single-ended testing to verify that the tip and ring legs of the line pair are "equal" and therefore are balanced. Such a test can alert the existence of a fault to a craftsperson but cannot describe the type or location of the fault.

Examples of test equipment used to locate line pair faults and splits are the "Cable Fault Locator," model number C-4904A and the "Open and Split Fault Locator" model number C-4910G, both available from Communications Technology Corporation.

The "Cable Fault Locator" is a cable fault locator system which locates grounds, shorts, crosses and splits. The system determines the path and depth of a buried line pair or cable by transmitting a high energy tone onto the telephone line pair to induce an electromagnetic field. The craftsperson must walk the length of the line pair with an inductive wand to detect the electromagnetic field propagating from the buried line pair. While walking, the craftsperson monitors an analog meter for indications of where the fault may be. The craftsperson may have to walk anywhere from 10 feet to 40,000 feet before locating the fault.

The "Open and Split Fault Locator" provides a digital meter readout for determining the location of a split in a spliced line pair. To operate the device, a craftsperson first must determine which line pairs comprise the split and then ensure that the line pairs being tested are of equal length else the test cannot produce an accurate split location. Such "open and split locator" devices utilize two-terminal capacitance measurement methods which cannot distinguish the individual $C_{TR}$, $C_{TG}$ and $C_{RG}$ capacitances affected by the presence of a split. Typically, the $C_{TG}$ capacitance of the analyzed line pair decreases in magnitude and the line pair $C_{RG}$ and $C_{TG}$ capacitances increase in magnitude.

When devices such as the "cable fault locator" and the "open and split fault locator" cannot accomplish the desired objectives, the craftsperson resorts to an analog meter commonly referred to as a "kick meter." The term "kick meter" describes the action of the meter needle when the meter is initially attached to a line pair. The needle "kicks" across the meter in proportion to the amount of capacitance present on the line pair up to a parallel fault. The craftsperson, based on his experience, guesses the distance along the line pair to the fault. The accuracy of the craftsperson's guess is further cast into doubt if there is a resistance in the line, such as a series fault. The presence of a series fault affects the "kick" of the needle and therefore affects the craftsperson's guess as to where the fault is located.

Advancements in measuring techniques brought into use three-terminal measurement analysis where the tip, ring and ground legs are connected for a three-terminal analysis. Although an advancement from commonplace two-terminal measurements, the devices implementing three-terminal measurement analysis also have downfalls. First, these devices operate using waveforms having only one frequency, allowing only a one-dimensional analysis. Second, these prior devices implement antiquated technology using synchronous detectors which rely heavily on electronic hardware, adding to the weight and the bulk of the unit. Furthermore, because of the reliance on hardware, numerous potentiometers are incorporated. The greater the number of potentiometers, the greater the device's complexity and the need to calibrate the unit before each use. Also, these prior devices cannot compensate for inductances in the line pair which would render the devices useless. A further limitation inherent with these prior devices is that only direct current (DC) resistances, or "zero-phase" impedances," are analyzed. Alternating current (AC) resistances are ignored except for determining whether "clipping" of test waveforms occurs in the line pair. Clipping affects the accuracy of a measurement obtained by these prior devices.

A need exists for a line pair analyzer which is compact, complete, lightweight and easily used by a craftsperson. Additionally, a need exits for devices providing exacting measurements in a minimal amount of time and training to allow a craftsperson to expeditiously obtain a complete line pair diagnostics.

SUMMARY OF INVENTION

According to one aspect of the invention, an apparatus for analyzing a telephone line pair is provided. The apparatus has a first line connector, a second line connector and a ground line connector, a microcomputer and a waveform generator for generating a first source waveform having at least two frequencies and a second source waveform having at least one frequency equal to at least one frequency of the first source waveform. The transmitted source waveforms propagate a first reflected waveform and a second reflected waveform over the first and the second line connector, respectively. A meter processes the first and the second reflected waveforms for impedance and phase values using a frequency domain to analysis algorithm. A first and a second power supply terminal is electrically connected to the waveform generator and the meter for connection to a power source. This aspect of the invention provides a variety of analysis to the craftsperson. Also processed from the impedance and phase values is load coil counts, frequency measurement of the reflected waveforms, and electrical characteristics of the line pair.

According to another aspect of the invention, a telephone line pair interface circuit is provided. A capacitor is incorporated into several circuits comprising a snubbing circuit, a monitoring circuit, a telephone ring signal detection circuit, and an simulated inductance circuit to maintain a telephone line electrical connection with a telephone central office. A plurality of multiple contact switching relays are connected to the snubbing circuit, the monitoring circuit, the ring signal detecting circuit and the simulated inductance circuit are so arranged constructed and interconnected as to selectably provide a selection of any of the circuits electrically connected to the connection terminals.

Another aspect of the invention provides a digital potentiometer. A first and a second connection terminal and a wiper terminal are provided for incorporating the potentiometer into an electrical circuit. A plurality of multiple contact switching relays are interconnected with a series-resistance bank. A controller circuit manipulates the plurality of multiple contact switching relays. The terminals, the resistance bank, and the relays are so arranged constructed and interconnected as to selectably provide a plurality of resistance values across the connection terminals.

In another aspect of the invention, a bridge circuit provides an automated analysis of a distance to a parallel fault in a telephone line pair. The bridge circuit has a digital potentiometer which is controllable by a microcomputer. A high DC voltage source is electrically connected to the digital potentiometer and a ground plane to stimulate the parallel fault for detection purposes. A differential amplifier circuit is connected across the digital potentiometer circuit. The potentiometer circuit is adjusted or manipulated by a microcomputer executing a program until a null or zero voltage is produced at the output of the differential amplifier.

In a further aspect of the invention, a telephone line pair diagnostics circuit is to provided. Connection terminals are provided to electrically interface the circuit with the line pair. A plurality of multiple contact switching relays are implemented to provide a predetermined variety of circuit configurations to add to the flexibility and analytical power or the analyzer. An analysis platform is provided by a transformer. The transformer is incorporated into a stressed longitudinal balance analysis circuit, a power influence analysis circuit, a phantom tone circuit and a DC voltage measurement circuit. The connection terminals, the stressed longitudinal balance analysis circuit, the power influence analysis circuit, the phantom tone circuit, the DC voltage measuring circuit, and the transformer are so arranged constructed and interconnected as to selectably provide a predetermined selection of any of the circuits to the connection terminals.

These and other features, advantages, and objects of the present invention will be apparent to those skilled in the art upon reading the following detailed description of preferred embodiments and referring to the drawing.

BRIEF DESCRIPTION OF THE DRAWINGS

The accompanying drawing is incorporated into and forms a part of the specification to illustrate several examples of the present invention. The figures of the drawing together with the description serve to explain the principles of the invention. The drawing is only for the purpose of illustrating preferred and alternative examples of how the invention can be made and used and is not to be construed as limiting the invention to only the illustrated and described examples. The various advantages and features of the present invention will be apparent from a consideration of the drawing in which:

FIGS. 20A–20C are an electrical schematic representations of various testing functions provided by the invention;

DETAILED DESCRIPTION OF THE PREFERRED EMBODIMENT

Figure 1:
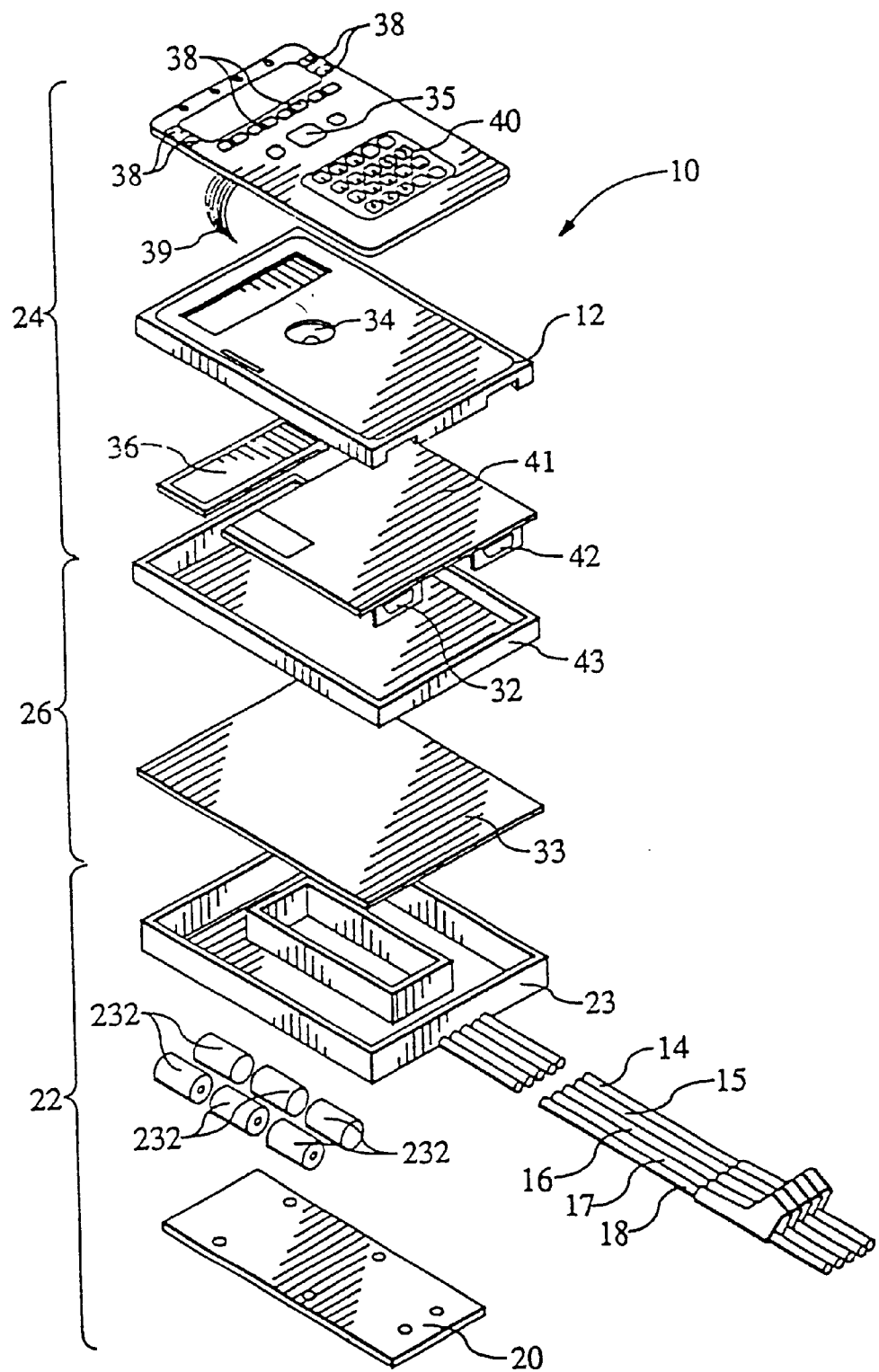
FIG. 1 is an exploded view of the housing of the line pair testing and fault diagnostic apparatus of the present invention without electrical circuitry.

The present invention will be described by referring to apparatuses and methods showing various examples of how the invention can be made and used. Like reference characters are used throughout the several views of the drawing to indicate like or corresponding parts.

The line pair test and fault diagnostic apparatus of the present invention is designed for convenient use and connection to desired telephone line pairs for analysis.

Referring to FIG. 1, a precision phase-controlled multi-frequency signal generator, meter and fault diagnostic line pair analyzer referred to generally by the numeral 10 is shown. The analyzer housing 12 is of a rectangular design dimensioned approximately the size of a handbook. The convenient size allows easy manipulation by a craftsperson while analyzing a line pair while in precarious positions such as while suspended from a telephone pole. The housing 12 has test lead connectors 14, 15, 16, 17 and 18 connected to the internal circuitry through screw terminals (not shown) to allow individual repair of each test lead by the craftsperson. The test lead connectors 14 through 18 extend from under a battery cover 20 for electrical protection of the interior circuitry from the elements.

As shown in FIG. 1, the housing 12 has three portions: a bottom portion 22 which contains analog and power circuitry 200; a top portion 24 which contains a craftsperson interface and digital circuitry 100; and an expansion portion 26 having essentially all of the same dimensions as the top and the bottom portions of the housing 12. The expansion portion 26 is sandwiched between the top portion 24 and the bottom portion 22. The expansion module can contain an electronics option package with functions such as: time-domain reflectometers; wide band width measurements; or ISDN (Integrated Services Digital Network) interfaces.

An audio speaker 34 is mounted in the top portion 22 and is oriented to face the craftsperson. Audio sound is conveyed through an audio-transparent plastic cover 35 which serves to protect the speaker 34 from the elements. A back-lit video display 36 is provided with full graphic capability and a soft-key 38 and an alphanumeric keypad 40 to interface with the craftsperson. A plurality of conductors 39 interface the keypad 40 with the digital portion 100. The soft-keys 38 allow the craftsperson to scroll through test options on the display 36 available from the line pair analyzer 10. As shown, the analyzer keypad 40 and display 36 are arranged so that either side of the analyzer can be held by left- or right-handed craftspersons.

A first non-conductive circuit board 41 for the digital portion 100 is positioned between the top portion 24 and the expansion portion 26. A serial communications port 32 and an expansion port 42 are shown connected to the end of the circuit board 41. The serial port 32 is provided to update the software, perform calibrations, to print out measurements and other stored data without the necessity of opening the assembled housing 12. The expansion port 42 is available for interfacing peripheral devices (not shown) with the expansion portion 26.

The expansion portion 26 is mounted on the bottom portion 22 with a second non-conductive circuit board 33 for the analog portion 200. As shown, a plurality of batteries 232 are contained within a battery cavity 233 defined in the bottom portion 22. A battery cover 20 is held in place with screws or other mounting means to retain the batteries 232 in the battery cavity 233. The batteries suitable for providing electrical power analyzer 10 comprise six C-Cell batteries 232. As should be readily apparent to those skilled in the art, other varying power sources can be used to achieve the same functions within the analyzer 10.

I. Digital Portion

Referring to FIGS. 2–6, the digital portion 100 of the analyzer comprises a microcomputer circuit 102, a meter/waveform generator circuit 104, a caller ID and DTMF decoder circuit 106, a modem circuit 108, a display interface 110, a "time of day" clock circuit 112, a power supply control circuit 114, and a keyboard interface 116.

Figure 3A:
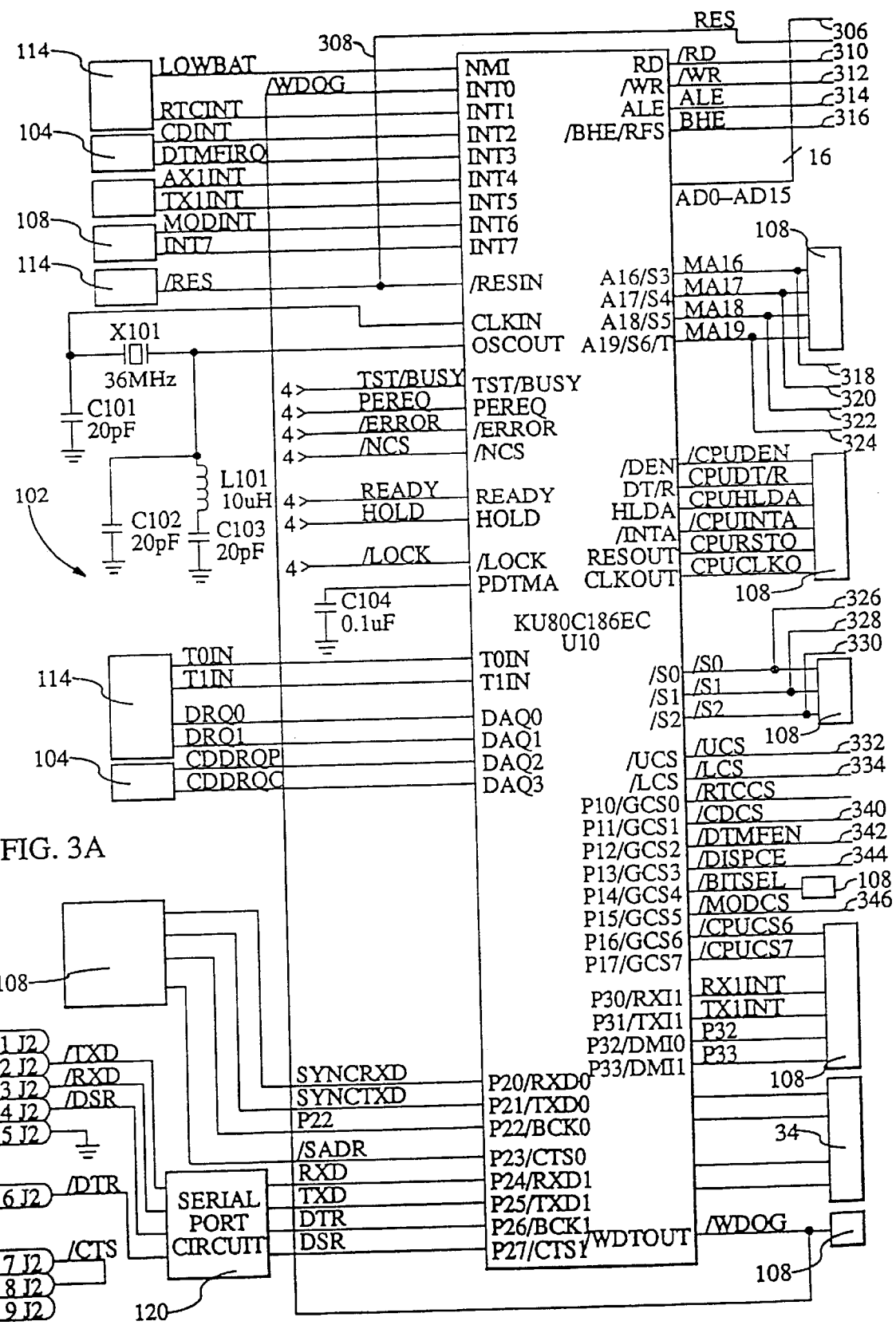
FIGS. 3A–3C are an electrical schematic diagram illustrating the interconnections of the microcontroller, electronic memory devices, ports and other elements of the microcomputer circuit of the invention.
Figure 3B:
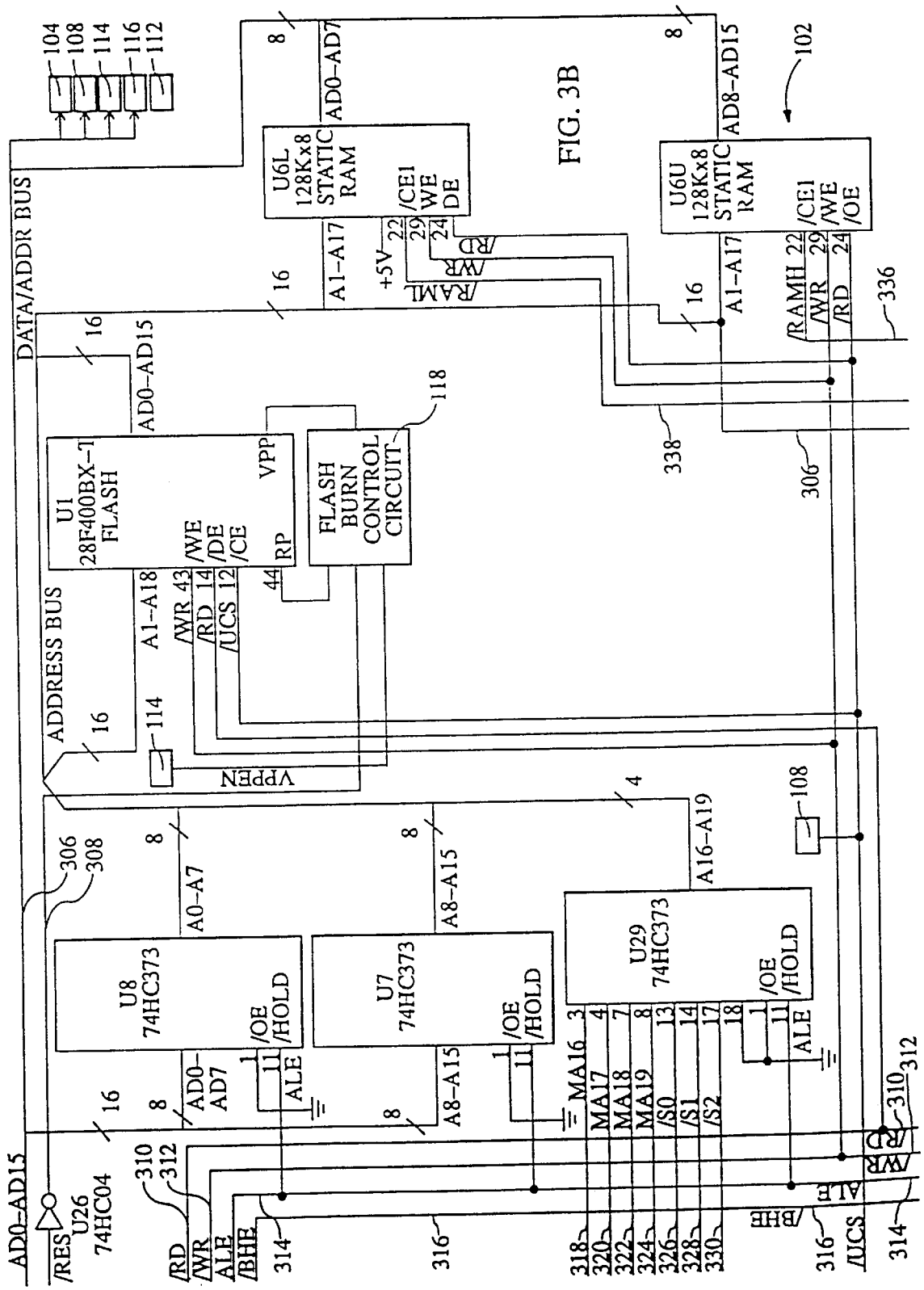
Figure 3C:
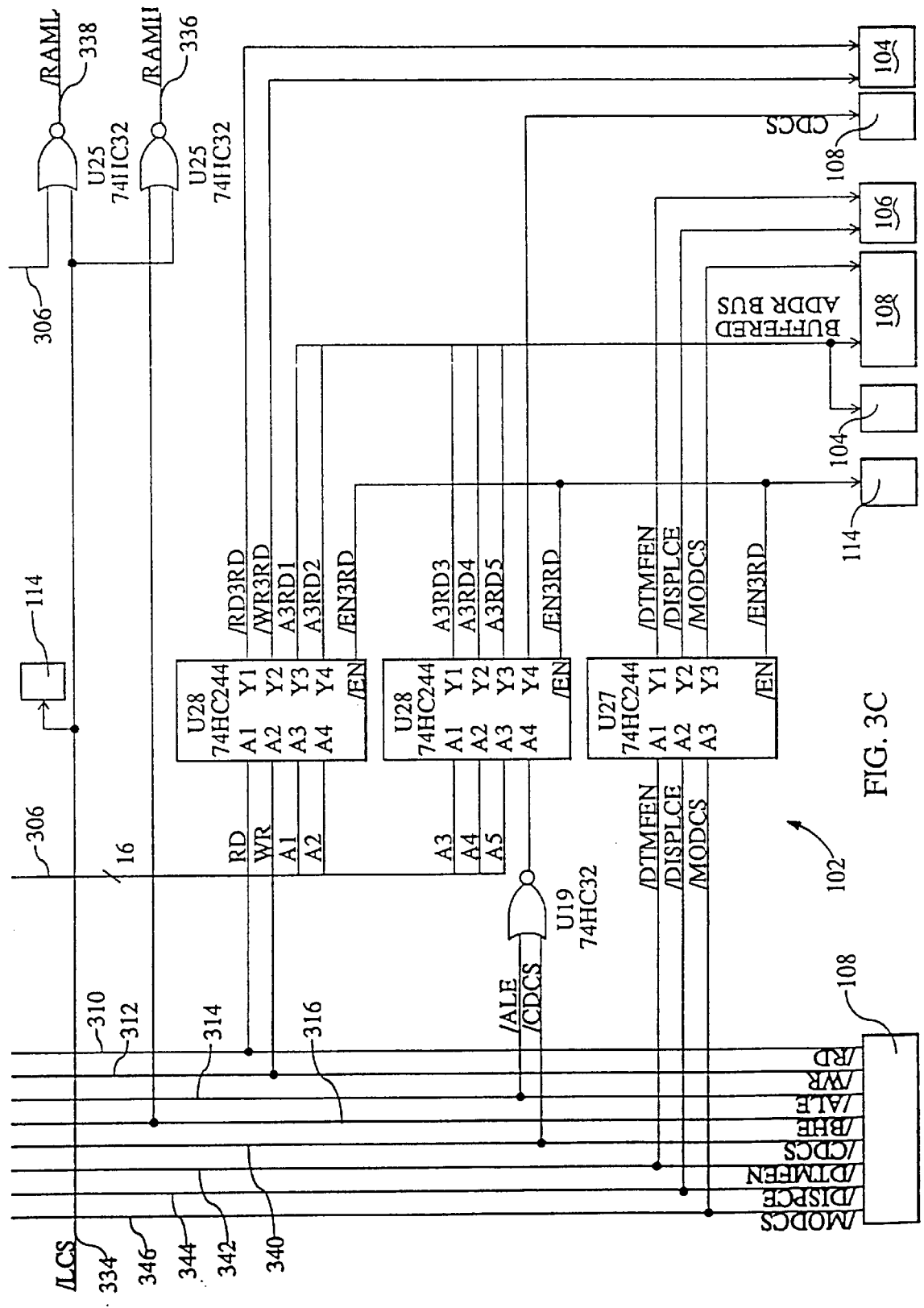

Referring to FIGS. 3A, 3B and 3C, shown is the microcomputer circuit 102. A microcontroller U10 is connected to a flash programmable read-only memory (PROM) U1 having control circuitry 118 and connections to a static random access memory (SRAM) U6L and U6U. These elements comprise a microcomputer to carry out instructions from a software program stored in the program memory customarily provided by a ROM. Another suitable microcomputer can be created with other and varying solid-state devices such as digital signal processing (DSP) integrated circuits and other electronic memory devices. Nevertheless, the microcontroller U10 has lower power demands and flexibility suitable for the demands of the analyzer 10. A suitable microcontroller is a KUB0C186EC provided by Intel. A suitable Flash PROM is a 28F400BX-T also available from Intel. A data/address bus is provided by address latches U7, U8 and U29 with an address line enable (ALE) signal line controllable by the microcontroller U10 to control the flow of either data or address data over the bus. Note that the terms "signal line" and "connection" connotes an electrical pathway established by an electrical conductor of suitable conductivity to allow a flow of electrons from one point to another. Such a conductor is a copper-based alloy run on the circuit boards 33 and 41, respectively. Connected to the microcontroller U10 is a serial port circuit 120. The serial port circuit can be implemented with a MAX242 provided by Maxim.

Buffers U28 and U27, shown in FIG. 3C, isolate the digital portion 100 from the all-time power and the part-time power requirements of the line pair analyzer 10 as designated by the power supply control circuit 114 (FIG. 6B), discussed later. The buffered output terminals of buffers U27 and U28 are connected to the CODEC U9 shown in FIG. 4A.

Figure 4A:
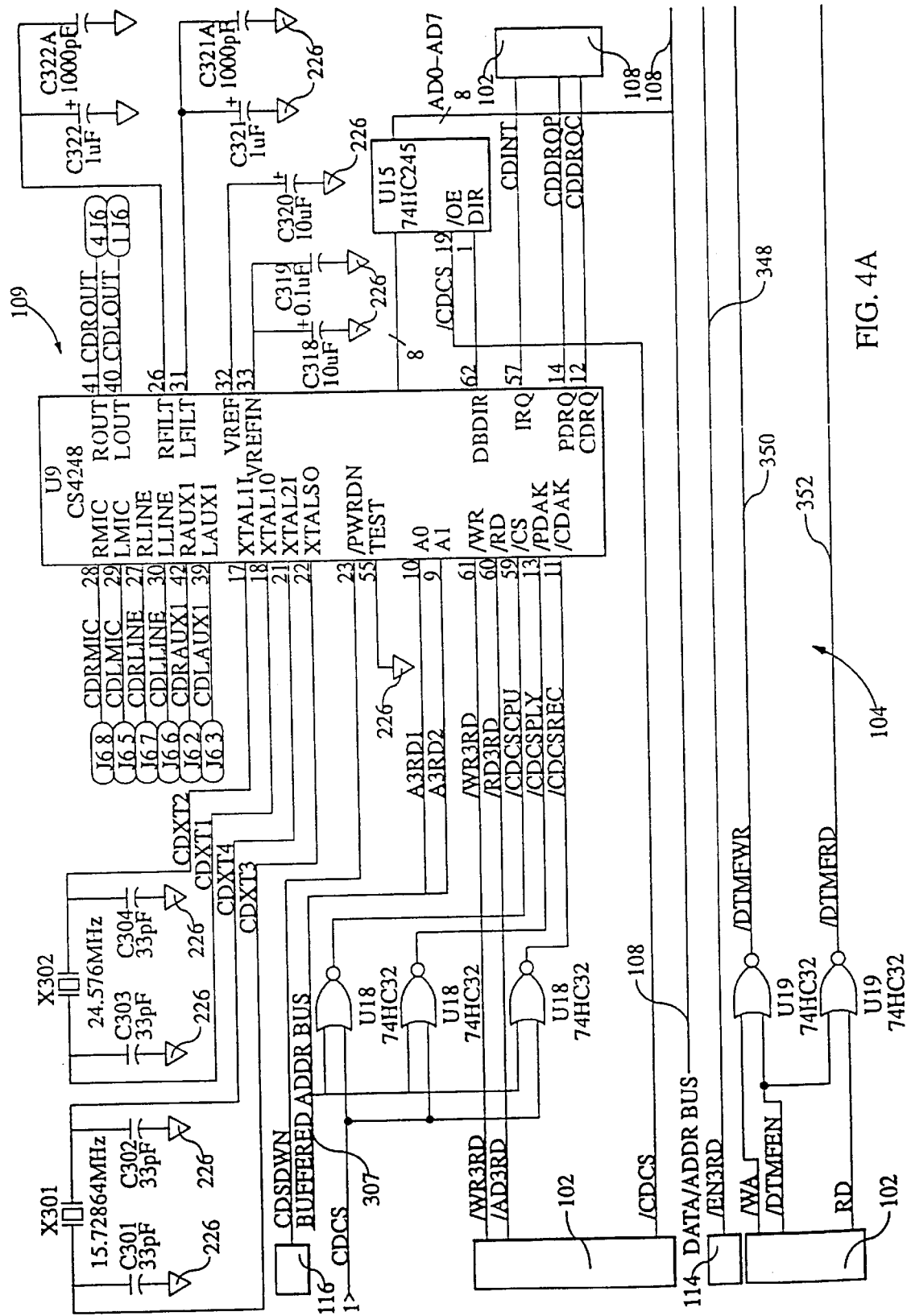
FIGS. 4A–4B are an electrical schematic diagram illustrating the interconnections of the meter/waveform generator circuit and of the Caller ID and DTMF Decoder circuit of the invention.
Figure 15:
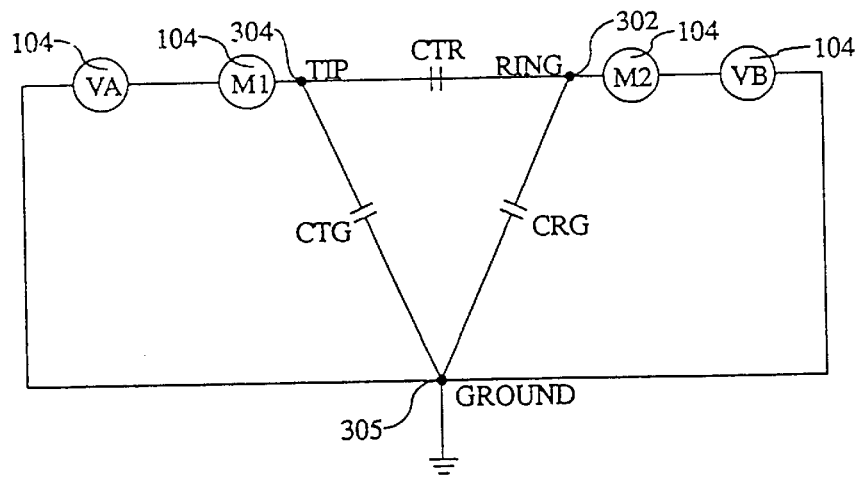
FIG. 15 is another electrical model schematic of the capacitance values of connections of the analyzer waveform generators and meters.

Referring to FIG. 4A, shown is a meter/waveform generator circuit 104. The meter and waveform generator means is provided by a stereo CODEC U9 having a dual-channel Analog-to-Digital/Digital-to-Analog (AD/DA) converter. A suitable CODEC device is a CS4248 available from Crystal Semiconductor Corporation and is described in "Parallel Interface, Multimedia Audio Codec" dated January 1993, Pub. No. DS106PP1 pages 1–33. Referring to FIG. 15, illustrated is the connection of the source voltages $V_A$ and $V_B$ and meters $M_1$ and $M_2$ to a line pair in a three-terminal measurement analysis.

As shown, the CODEC U9 has an analog right channel CDROUT terminal 41 and an analog left channel CDLOUT terminal 40. These terminals provide the source voltages $V_A$ and $V_B$, respectively, as illustrated in FIG. 15. Referring to FIG. 4A, the CODEC U9 has RLINE terminal 27, LLINE terminal 30 and LAUX1 terminal 39. The RLINE and the LLINE terminals 27 and 30 provide a portion of the meter means $M_1$ and $M_2$, respectively. Other portions of the meter means are provided by the impedance measurement circuit 206 and the DC voltage measurement circuit 202, discussed later in detail. The CODEC U9 is connected to the microcomputer means shown in FIGS. 3A–3C by the buffered data/address bus 307.

Figure 4B:
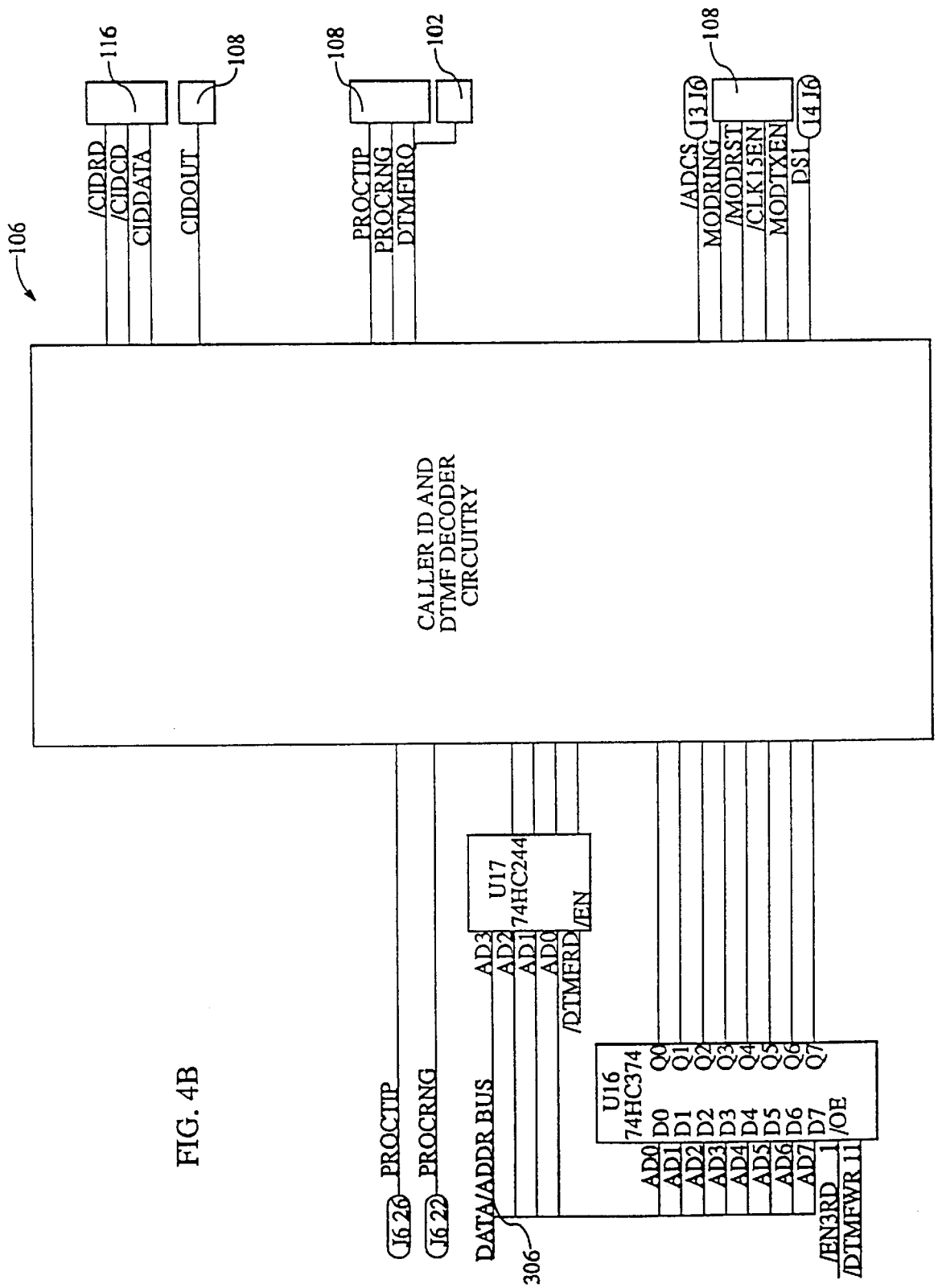

Referring to FIG. 4B, shown is a Calling Line Identification (CLID) and Dual-Tone Multi-Frequency (DTMF) Decoder Circuit 106. A suitable Caller Identification (ID) integrated circuit (IC) is available from Motorola under the part number MC145447 and is described in "Communications Device Data Book," pages 2–765 to 2–774. A DTMF decoder chip is available under the part number MT8870. The Caller ID and DTMF Decoder Circuit 106 is accessible by the microcontroller U10 through an addressable port provided by the buffer U17 and the D-Latch U16.

Figure 5A:
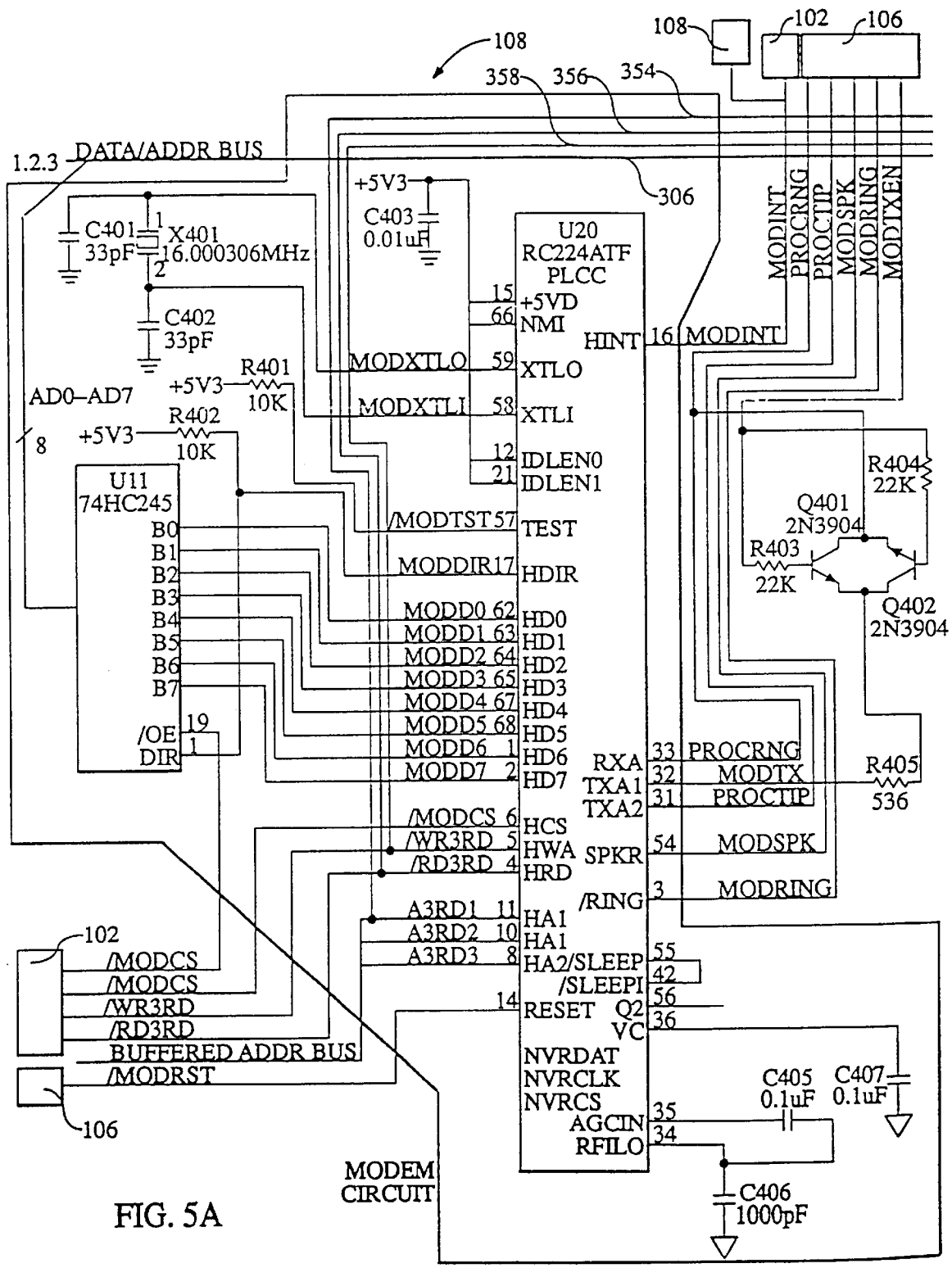
FIGS. 5A–5B are an electrical schematic diagram illustrating the interconnections of the modem circuit and associated ports and analog switches of the invention.
Figure 5B:
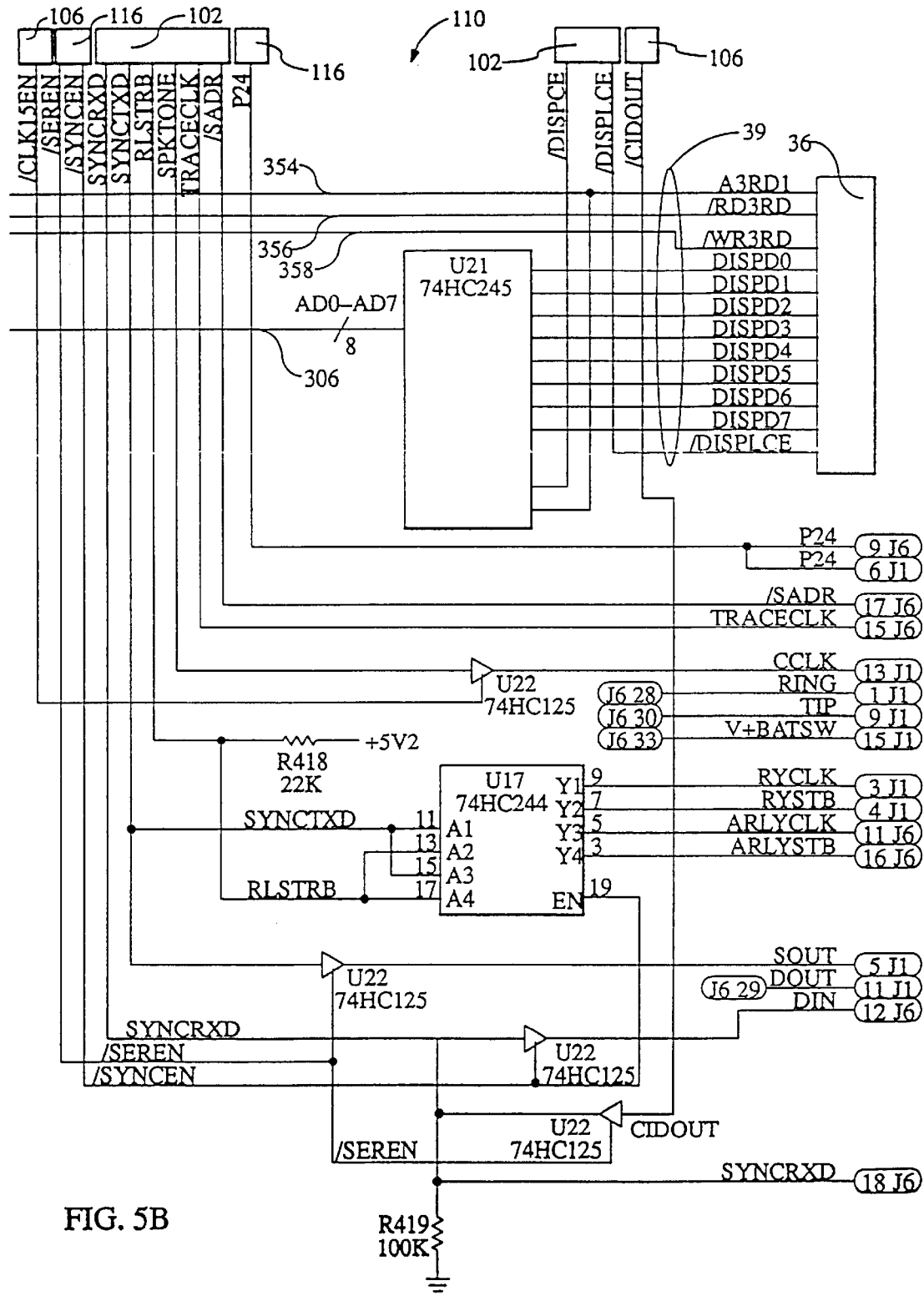

Referring to FIGS. 5A and 5B, shown is the modem circuit 108 to provide remote operations for the line pair analyzer 10. The modem circuit is based on a RC224ATF integrated circuit ("IC") U20 available from Rockwell International. With the modem circuit 108, the line pair analyzer 10 can remotely control the active strap devices available from Communications Technology Corporation. The smart strap is instructed by the line pair analyzer 10 through use of dual-tone multi-frequency ("DTMF") signals generated and conveyed by the modem circuit 108. A vacant telephone line pair in a telephone cable can be used to establish an electrical connection between the two devices. The analyzer 10 can also be remotely controlled by a craftsperson through a telephone line connection using DTMF signals. Another use of the modem circuit 108 is to download program software from a remote location into the analyzer 10.

A solid-state analog switch comprising npn-transistors Q401 and Q402 provides an interface of the digital portion 100 with the analog portion 200. The solid state switch disconnects one leg of the driver of the modem U20 to create a high impedance connection to the telephone line pair through the line interface circuit 210. As shown, transistor Q401 has a base terminal connected through a resistor R403 to provide the signal line MODTXEN. A collector terminal of the transistor Q401 and an emitter terminal of the transistor Q402 are connected to the signal line PROCRNG provided by the RXA signal terminal of the modem device U20. A base terminal of transistor Q402 is connected through resistor R404 to the signal line MODTXEN and to the base terminal of the transistor Q401 through series resistor R403. An emitter terminal of Q401 and a collector terminal of transistor Q402 are connected through resistor R405 to the modem device U20 terminal 32 When the signal line MODTXEN, connected to the modem device U20 terminal 32, goes "high," the transistors Q401 and Q402 saturate, providing a low impedance switch that reflects the impedance onto the telephone line.

A solid-state analog switch comprising npn-transistors Q401 and Q402 provides an interface of the digital portion 100 with the analog portion 200. The solid state switch disconnects one leg of the driver of the modem U20 to create a high impedance connection to the telephone line pair through the line interface circuit 210. As shown, transistor Q401 has a base terminal connected through a resistor R403 to provide the signal line MODTXEN. A collector terminal of the transistor Q401 and an emitter terminal of the transistor Q402 are connected to the signal line PROCRNG provided by the RXA signal terminal of the modem device U20. A base terminal of transistor Q402 is connected through resistor R404 to the signal line MODTXEN and to the base terminal of the transistor Q401 through series resistor R403. An emitter terminal of Q401 and a collector terminal of transistor Q402 are connected through resistor R405 to the modem device U20 terminal 32. When the signal line MODTXEN, connected to the modem device U20 terminal 32, goes "high," the transistors Q401 and Q402 saturate, providing a low impedance switch that reflects the impedance onto the telephone line.

Shown in FIG. 5B, a display interface 110 for the display 36 is provided with an Octal Bus Transceiver U21 available from Texas Instruments under the part number 74HC245 and is described in "The TTL Data Book," pages 3–826 to 3–828 (Vol. 2). An external expansion connector J1 is also shown which provides the plurality of electrical connections for the expansion port 42, described above.

Figure 6A:
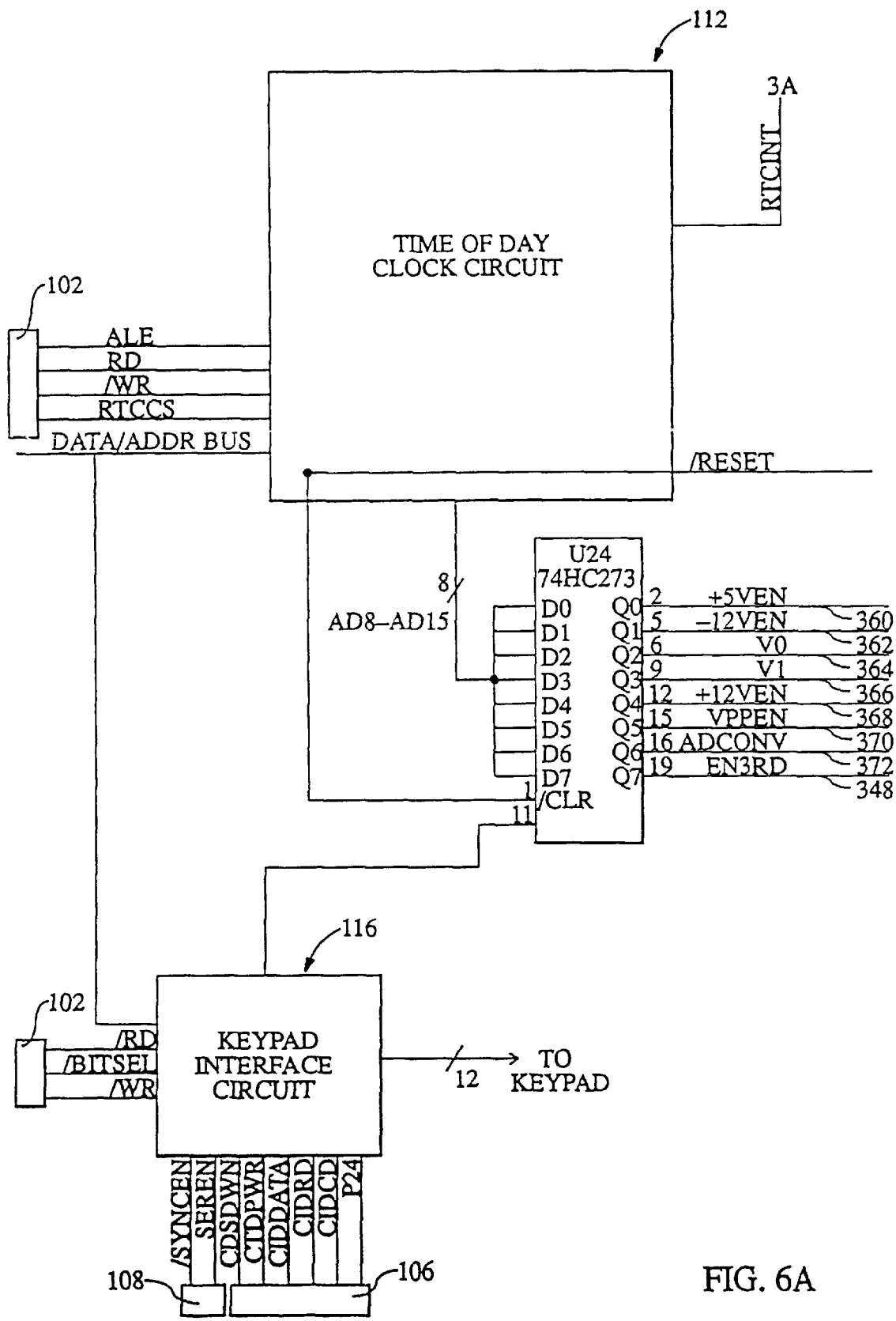
FIGS. 6A–6B are an electrical schematic illustration of the interconnection with the "time of day" clock circuit, keypad interface circuit and the power supply control circuit of the invention.

Referring to FIG. 6A, shown is a "time of day" clock circuit 112 to provide a time data records. A suitable IC for providing the clock circuit 112 is a DS1285QN driven by a 32.768 KHz oscillator. The DS1285QN is available from Crystal Semiconductor. Also shown is a keypad interface circuit 116 for accepting commands and instructions from the craftsperson through the keypad 40. A plurality of conductors 39 are connected to the keypad 38 and 40. The keypad interface circuit 116 can be embodied with a D-Latch U24 and buffers 74HC374 and 74HC244, respectively, available from Texas Instruments.

Figure 6B:
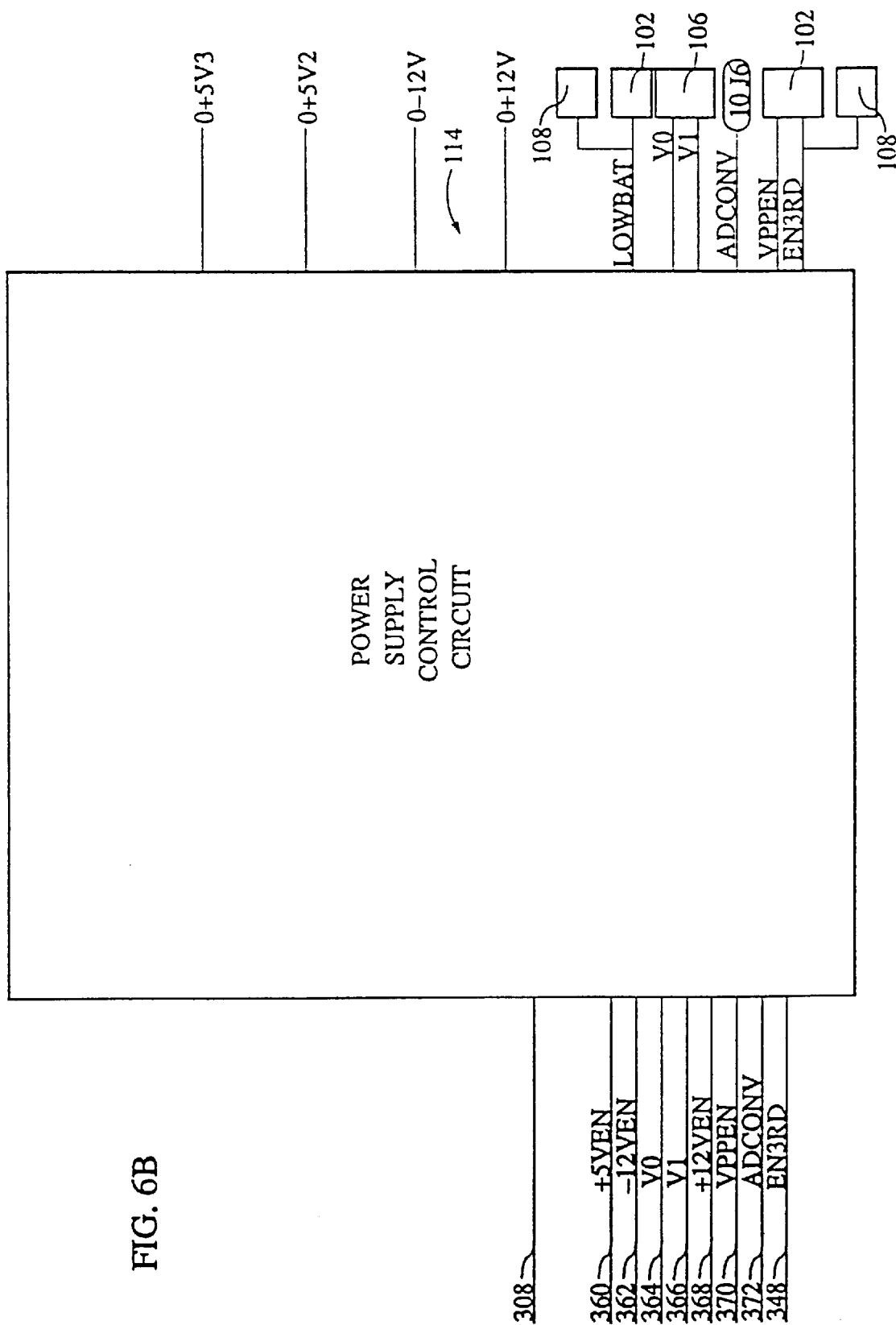

Referring to FIG. 6B, shown is a power supply control circuit 114 which routes and controls the power demands of the different functional segments of the line pair analyzer 10. For example, the SRAM devices U6L and U6U require a memory maintenance power and when the analyzer 10 is operational, the SRAM devices requires operational power. To provide these needs, the power supply control circuit 114 implements a Maxim 715 integrated control device, available from Maxim.

Figure 7:
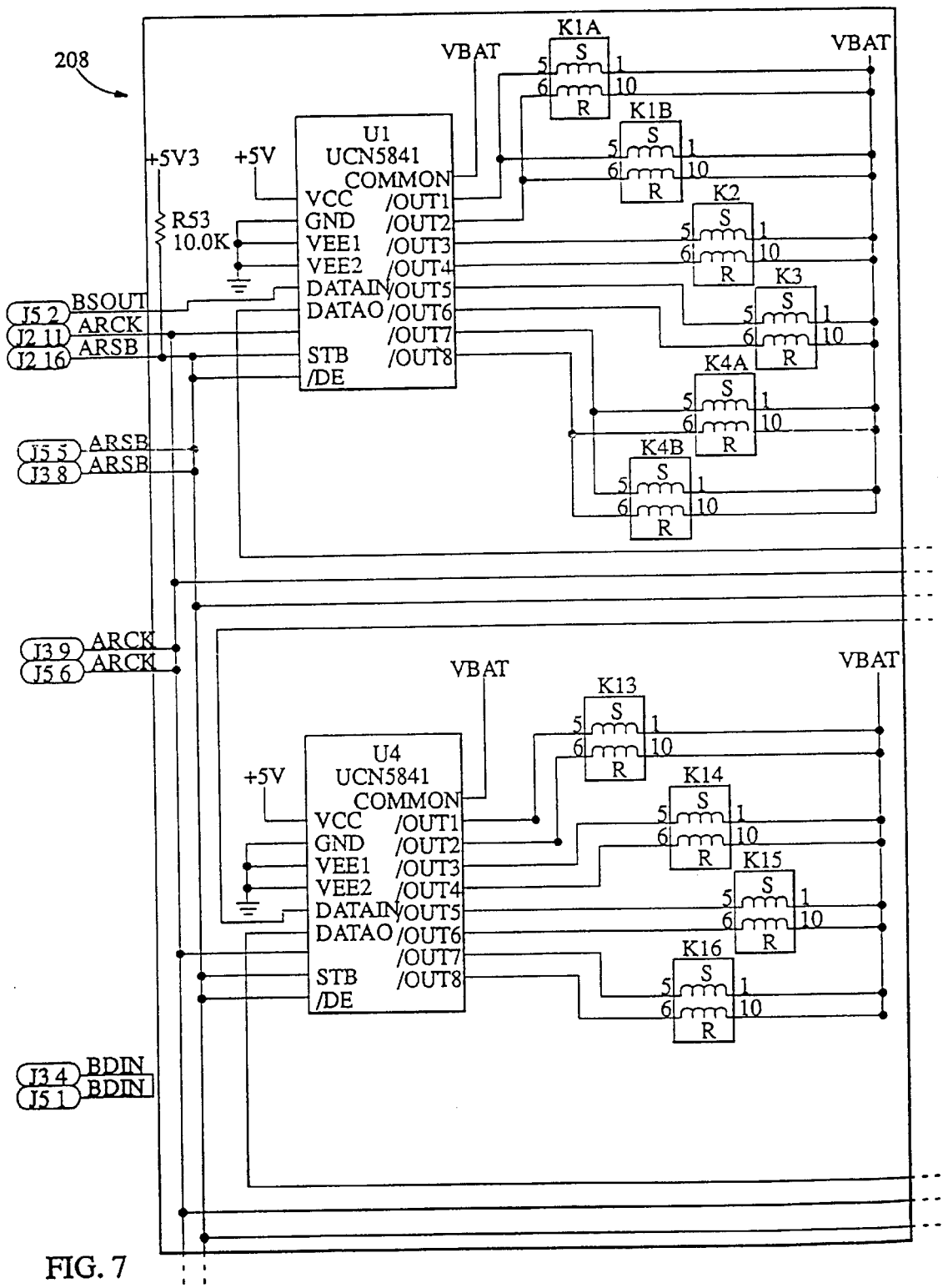
FIG. 7 is an electrical schematic example illustrating the interconnection of the digital portion with the analog portion through switching relays, shift register drive circuits and other elements of the analog/digital interface circuit of the invention.

Referring to FIG. 7, shown is an example of the analog/digital interface circuit 208. The circuit configuration shown is used repetitively and uniformly for enabling the digital portion 100 to control the analog relay configurations present in the analog portion 200 of the line pair analyzer 10. The circuit is embodied in a plurality of IC shift register devices and two-coil relays. A suitable shift register device is a UCN5841. The relays are of a two-coil latching type such as the commercially available Aeromat TQ series or equivalent. The "set" and "reset" coils of these relays are activated under the control of a series-connected string of IC shift register devices. The shift register devices receive clock and strobe pulses ARCK and ARSB, respectively, generated on and delivered from the digital portion 100. Data signals generated on the digital portion 100 are fed to the shift registers devices to the data input of the first device. The data signals are fed from the output terminal of each register device to the input of each succeeding register device.

II. Analog Portion

Figure 2:
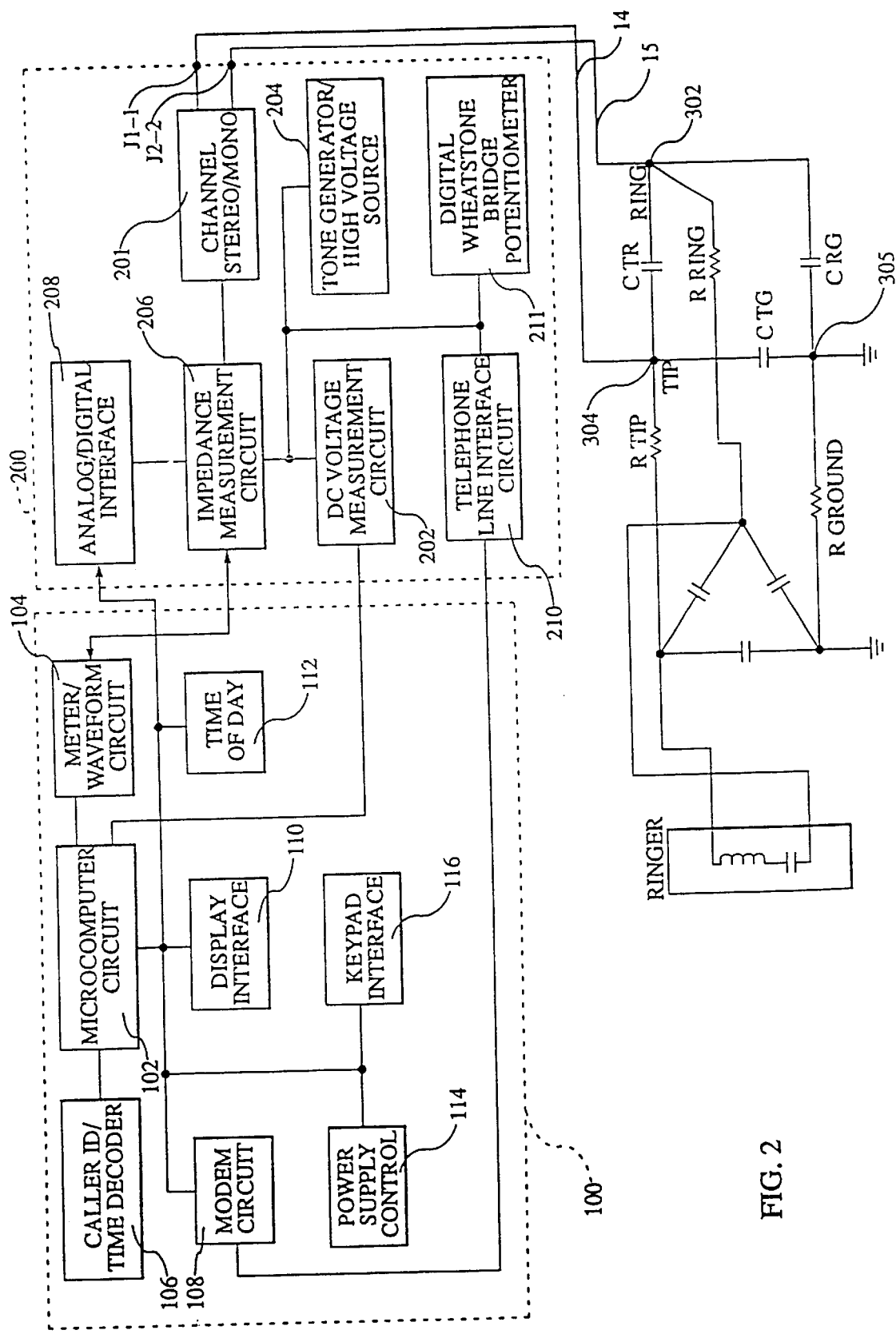
FIG. 2 is a block diagram illustrating the principal functional circuitry of the line pair testing and fault diagnostic apparatus of the present invention.

Referring to FIGS. 2 and 8–3, shown is the analog portion 200 of the line pair analyzer 10. The analog portion 200 comprises a direct current (DC) voltage measurement circuit 202, a tone generator/high voltage source circuit 204, an impedance measurement circuit 206, an analog/digital interface circuit 208, a multi-function telephone line interface circuit 210, and a digital potentiometer 211.

Figure 8A:
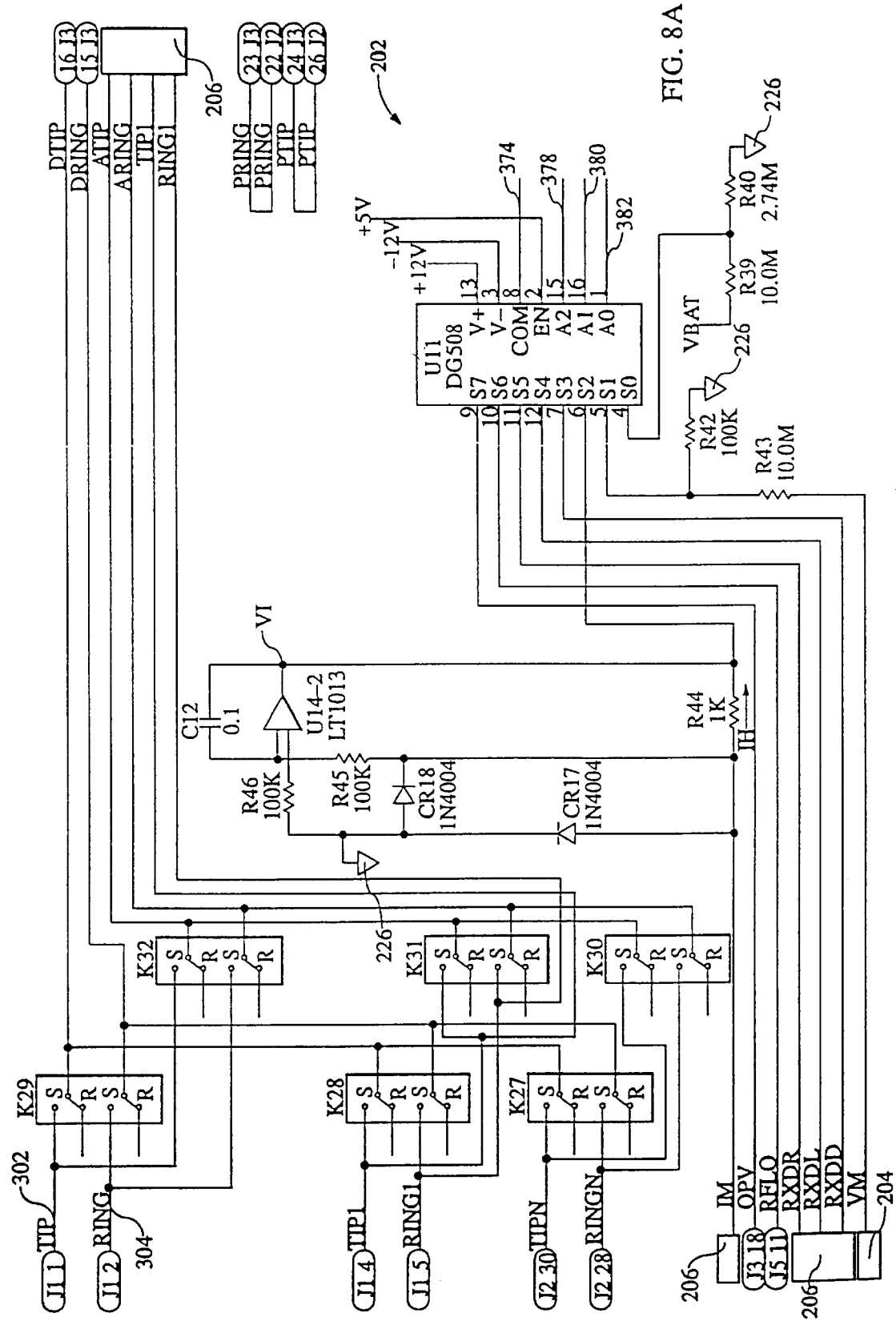
FIGS. 8A–8B are an electrical schematic illustration of the primary input terminal connections of the line pair to the analyzer and of the DC voltage measurement circuit of the analog portion of the invention.

Referring to FIG. 8A, shown is a connector J1 which interfaces with the test lead connectors 14, 15, 16, 17 and 18 for interfacing the analyzer 10 with the line pair to be analyzed. As shown, a first line pair can be connected to connector J1 sockets 1 and 2 for providing the TIP and RING lines 302 and 304, respectively, and a second line pair can be connected to connector J1 sockets 4 and 5, respectively, for providing the TIP1 and RING1 lines 298 and 300, respectively. Two line pairs are typically connected for split fault analysis, discussed later in detail. The grounds, or shields, 305 of the line pair or pairs can be detachably connected through test lead 18 to connector J2 sockets.

Figure 9:
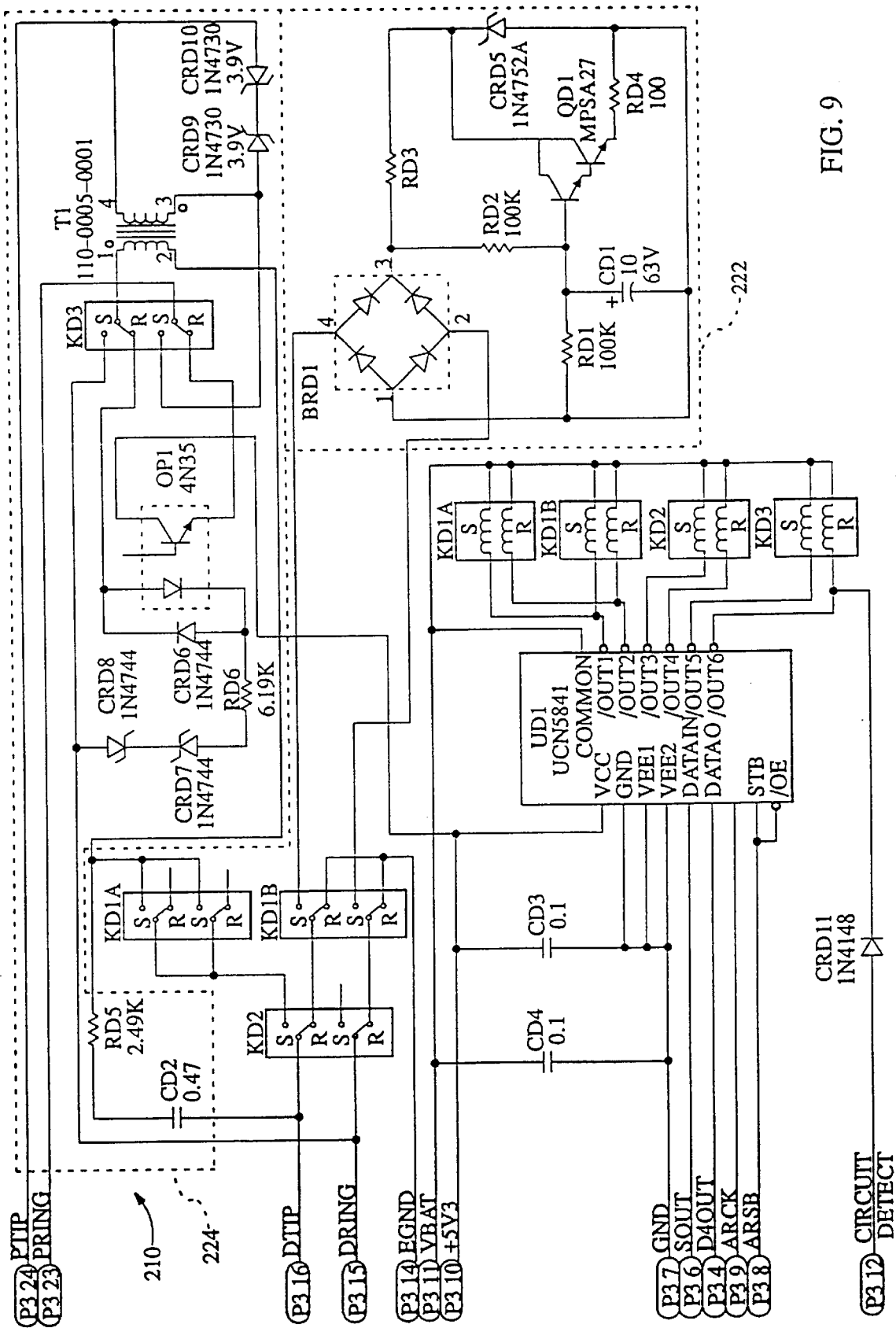
FIG. 9 is an electrical schematic illustration of the capacitor, transformer, optoisolator and other elements of the telephone line interface circuit of the invention.

Referring to FIG. 9, shown is a telephone line pair interface circuit 210 comprising at least two connection terminals provided by socket connections P3 pins DTIP 16 and DRING 15 to interface with a line pair connected to the analyzer 10. Relays KD1A, KD1B, KD2 and KD3, each relay having a first and a second contact connection condition and at least one activating element are controllable by the microcomputer 102 having electronic memory means U1, U6L and U6U for changing the relays between the first and the second contact connection conditions. The control circuitry is illustrated in FIG. 7. The line pair interface circuit 210 also has a capacitor CD2, a snubbing circuit with the capacitor CD2 aid a resistor RD5, a monitoring circuit 224 which incorporates the capacitor CD2 for monitoring an electrical signal flow on the telephone line pair before disrupting the signal flow, a detecting circuit which incorporates the capacitor CD2 for detecting a telephone ring signal, and an inductance simulating circuit 222 for simulating a large inductance to carry loop current from the line pair once a communication connection is established on the opposite end of the telephone line pair. The connection terminals, the snubbing circuit, the monitoring circuit, the ring signal detecting circuit and the simulated inductance circuit are so arranged constructed and interconnected as to selectably provide a predetermined selection of any of these means to be electrically connected to the connection terminals of P3 pins 15 and 16 in dependence upon the contact connection conditions of the relays.

A. Interface Circuit

Referring to FIG. 8A, the telephone pair to be selectably connected to the line interface circuit 210 is routed to the connector J3 sockets 15 and 16. Referring to FIG. 9, the DTIP and DRING signal lines from the connector P3 pins 15 and 16 are routed through the relays KD2, KD1A, KD1B and KD3 to the desired circuit of the telephone line interface circuit 210. The DTIP signal line is connected to capacitor CD2. The capacitor CD2 is at least a 250-volt self-healing 0.47 $\mu$F capacitor CD2 when exposed to voltage spikes. A suitable capacitor is a polypropylene capacitor. As disclosed above, the capacitor CD2 is used to provide a high-impedance monitoring/ring detector circuit 224.

1. Snubber Circuit

As part of a snubber circuit, the capacitor CD2 is connected in series with the resistor RD5. The series circuit of capacitor CD2 and resistor RDS save wear by absorbing inductive kick from the line pair when connected to the analyzer 10. If rotary dialing is used or if there is a loop current present, the snubber circuit interferes with communications on the line pair. Relays KD2 and KD1A can be "set" or activated to bypass the snubber circuit to allow proper operation of the test circuit and loop current measurement circuit when necessary.

2. High Impedance Line Pair Monitor

The second function provided by the capacitor CD2 is as a part of the circuit providing a high impedance telephone line monitoring circuit to monitor a line pair for telephone conversations before disrupting service. When the relays K1 and K2 are "reset" and the relay K3 is "set," the capacitor CD2 and resistor RD5 are in series to the primary winding of the transformer T1. The primary side return is connected to the DRING signal line. The transformer T1 is a welded frame-type capable of withstanding loop current available under the part number 110-0005-0001. The secondary winding terminal 4 of the transformer T1 is connected to the PTIP signal line and then to the PROCRING signal line shown in FIG. 5A. Also shown in FIG. 5A, the line pair is effectively terminated by energizing, or opening, the solid-state switch comprising transistors Q401 and Q402 on the modem circuit 108, as discussed earlier in detail. Any AC signals or voltages on the connected line pair are isolated from the analyzer 10 circuitry by the transformer T1. The monitoring mode of the circuit 224 is incurred by placing a high input impedance onto the line pair. The microcontroller U10 can then monitor the line pair for use by subscribers before performing diagnostic tests or for use in caller ID sequences where the loop current has not yet been established.

3. Ring Detect Circuit

The third function of the capacitor CD2 is to provide a ring detect circuit, or detecting means. As shown in FIG. 9, the primary winding terminal 2 of the transformer T1 is connected to the series combination of the capacitor CD2 and the resistor RD5. The relay KD3 is "reset" to connect the primary winding terminal 1 of the transformer T1 to the diode portion of an optoisolator OP1 having a diode portion and a transistor portion. The optoisolator provides a voltage level-shifter and electrical isolator to interface the line pair with detecting means comprising microcontroller U10. The optoisolator indicates the presence of a ring signal having a predetermined voltage. The optoisolator indicates the presence of a ring signal on the line pair by energizing and placing a voltage on the first terminal 3 of the secondary winding of the transformer T1. A suitable optoisolator is a 4N35 integrated circuit.

More specifically, a reverse bias diode CRD6 is connected in series to the resistor RD6. A 16-volt bi-directional Zener diode comprising Zener diodes CRD7 and CRD8 establishes a voltage threshold which a ring signal carried through the electrical conductor must overcome to activate the optoisolator OP1 through the terminals connected to the diode portion of the optoisolator OP1. Diode CRD6 has an anode terminal connected to the cathode terminal of the diode portion of the optoisolator and a cathode terminal connected to the anode terminal of the diode portion of the optoisolator OP1. Diode CRD6 provides over-voltage protection for the optoisolator OP1.

When a telephone ring signal is placed on the line pair to the analyzer 10 through the test leads 14 and 15, respectively, the optoisolator OP1 is energized, indicating the presence of a telephone ring signal to the microcontroller U10. The microcontroller U10 detects the occurrence of the telephone ring signal through emitter terminal of the optoisolator OP1 connected to the PRING signal line. The collector terminal of the transistor portion of the optoisolator is connected to a biasing voltage source +5V through the connector terminal P3 pin 10.

As shown in FIG. 5A, the PRING signal line is connected to the PROCRING signal line which is monitored by the microcontroller U10 through the modem circuit 108. If the PROCRING signal line goes "high" or "true," the optoisolator OP1 has been energized by a telephone ring signal and therefore the ring signal is detected by the microcontroller U10 through the first terminal 4 of the secondary winding connected to the PTIP signal line. The microcontroller U10 indicates that the ring signal is present by performing other diagnostic functions or alerting the craftsperson as directed by the computer program. Excessive voltages from the transformer T1 are clamped by the connection of the first terminal 4 and the second terminal 3 of the secondary winding across the Zener diodes CRD9 and CRD10 to protect the digital portion 100 of the analyzer 10.

4. Solid-State Hold-Coil Circuit

The solid-state hold-coil circuit 222 is provided to simulate a large inductance to carry loop current from the line but not interfere with AC signals. Loop current is present over the line pair connected to the analyzer 10 when the line pair is connected to the telephone central office 600 (see FIGS. 19A–19C). The hold-coil circuit 222 comprises a rectifier bridge BRD1, two balancing resistors RD1 and RD2, a capacitor CD1, and a Darlington transistor QD1. The rectifier bridge has a first input terminal 4, a second input terminal 2, a first output terminal 1 and a second output terminal 3. A capacitor CD1 is shunted with the resistor RD1 to provide a biasing voltage across the emitter terminal and the base terminal of the Darlington transistor QD1 and the current limiting resistor RD4. The biasing voltage across RD4 generates a constant current dependent only on the voltage present on the line pair thereby causing the hold-coil circuit 222 to simulate an inductor, or hold-coil. To prevent overheating, the collector terminal of the Darlington transistor QD1 is connected in series through a heat dissipating resistor RD3 which dissipates heat. For over-voltage protection, provided is a Zener diode CRD5.

When a connection is being made to the telephone line pair for dialing purposes, the relays KD1A, KD1B, KD2 and KD3 are "set." The primary side of the transformer T1 is connected to the DTIP and DRING signal lines. The secondary side of the transformer T1 is connected to PRING and PTIP signal lines which are connected to the microcomputer circuit 102 (FIG. 3A).

An example of when the hold-coil circuit 224 is employed is for performing dialing operation tests with the central office 600. When the microcomputer circuit 102 (FIGS. 3A–3C) requests a signal level measurement, the modem circuit 108 establishes a signal communications path with the central office 600 through the line pair. The microcomputer circuit 102 directs the modem circuit 108 to go on-line in a "direct connect mode." Using the Caller ID and DTMF Decoder circuit 108, the analyzer 10 dials a test telephone number set aside specifically for performing tests on the line pair. Once dialed, the analyzer 10 is electrically connected to the telephone central office 600 (see FIGS. 19A–19C). The hold-coil circuit 222 is then connected to the line pair to "hold" the loop current and therefore hold the electrical connection to the central office. The analog circuit connects to the circuit through the relays shown in FIG. 8A.

5. Solid-State Ringer Detection

The apparatus discussed above can also serve to detect a solid-state ringer device common to conventional phones and caller ID devices. Typically, the solid-state ringer device has a high input impedance which causes the craftsperson to incorrectly conclude that the line pair is "open" or not connected to a telephone on the opposite end of the line pair. The predecessor telephones to the modem telephone have a mechanical ringer with a large reactance and impedance of approximately 8 kohms. Using the line terminal transformer T1, the analyzer 10 generates a stimulus source waveform with the CODEC U0 and drives the stimulus source waveform, which is a precision sine wave, onto the line pair. The stimulus source waveform causes the solid-state diodes in a telephone ring circuit, shown in FIG. 2, to announce their presence innocuously. The announcement by the solid-state diodes is made by a change in the waveform shape which is reflected back. The reflected waveform will have the form of either a third or a fourth harmonic of the stimulus source signal. A program implementing FFT analysis can process the reflected signal received by the CODEC U9 LAUX1 terminal 39 to determine whether diodes are present in the ringer circuit using methods discussed below.

B. DC Voltage Measurement Circuit

Figure 8B:
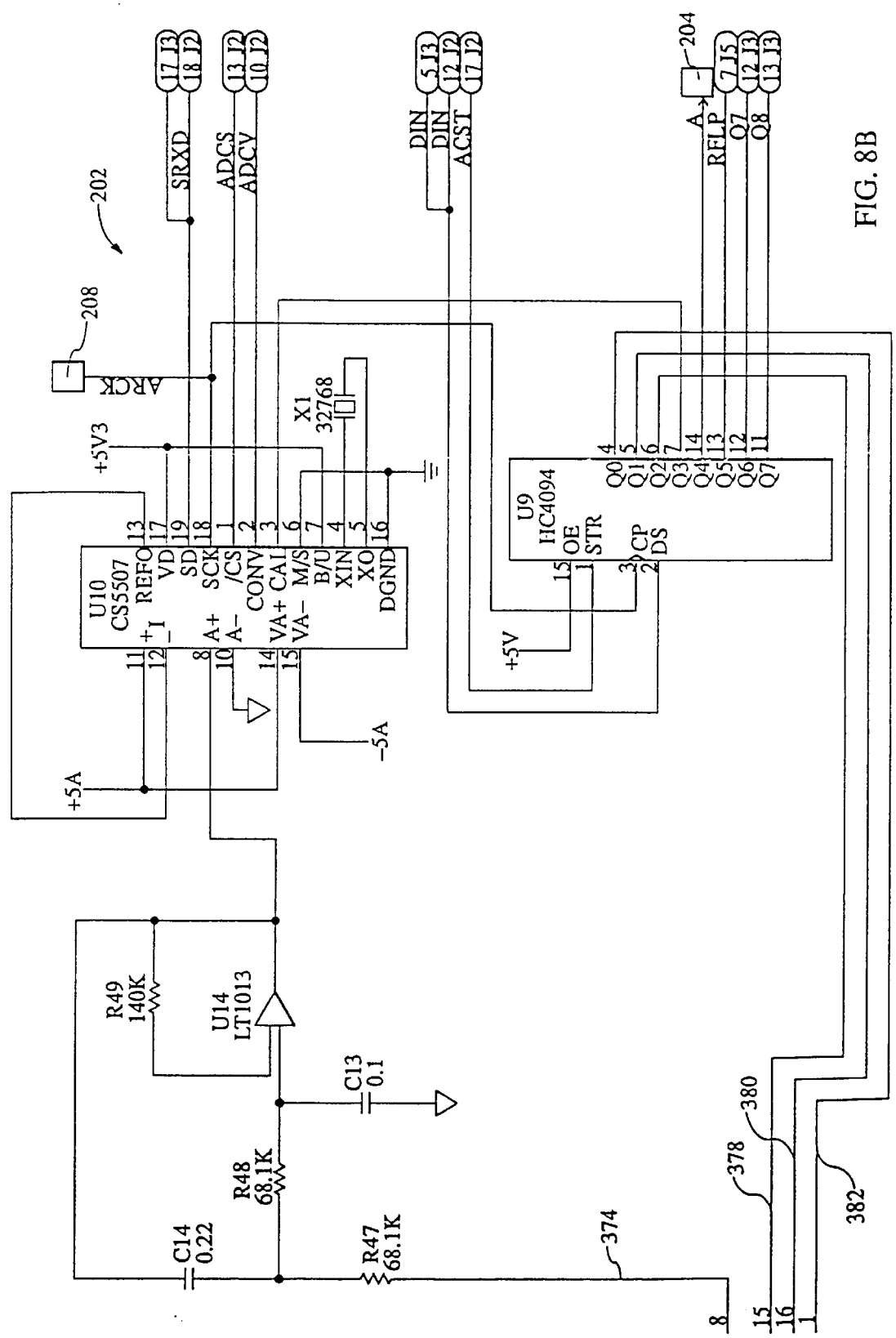

Referring to FIGS. 8A and 8B, shown is the DC voltage measurement circuit 202. The voltage measurement circuit has two op-amp circuits based upon op-amp U14-2 and op-amp U14-1, respectively. The first op-amp configuration comprises a zero-voltage drop current meter and the second op-amp configuration comprises a low-pass filter circuit. The op-amps are available from Sharp under the part number LT1013.

The current meter signal line IM from the impedance measurement circuit 206 to convey an electrical signal representative of the current in to or out of the line pair ground. The zero-voltage drop current meter is protected from over-voltage conditions by the diodes CR17 and CR18. The resistor R44 is connected, through series resistor R45, across the inverting terminal and the output terminal of the op-amp U14-2. The resistor R44 drives the current signal on the IM signal line. The non-inverting terminal of the op-amp U14-2 is connected through a series resistor R46 to system ground 226. At the output terminal of the op-amp U14-2 is a voltage $V_1$ which corresponds to the amount of current passing through the resistor R44, as dictated by the formula:

$$V_1 = 1000 * I_{R44}$$

The capacitor C12 is connected in the negative feedback loop of the op-amp U14-2 to complete the current-to-voltage conversion and to provide a preliminary low-pass filter having a cutoff frequency of about 25 Hz. The output of the op-amp U14-2 is input to a terminal 6 of a voltage multiplexer chip U11 which is available under the part number DG508.

Figure 10A:
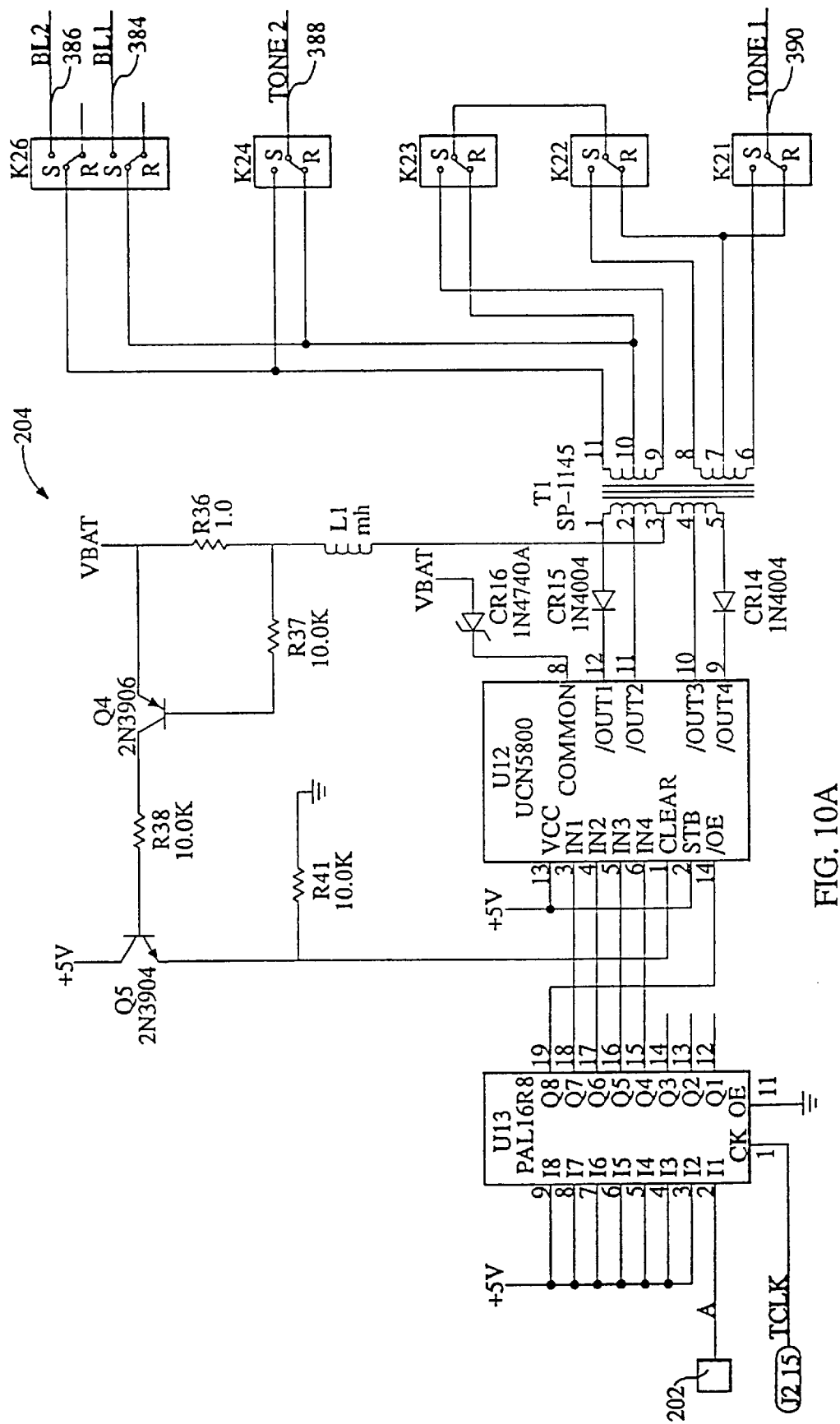
FIGS. 10A–10B are an electrical schematic illustration of the interconnections of a PAL, a driver IC, a transformer and other elements of the tone generator/high-voltage source circuit of the invention.
Figure 10B:
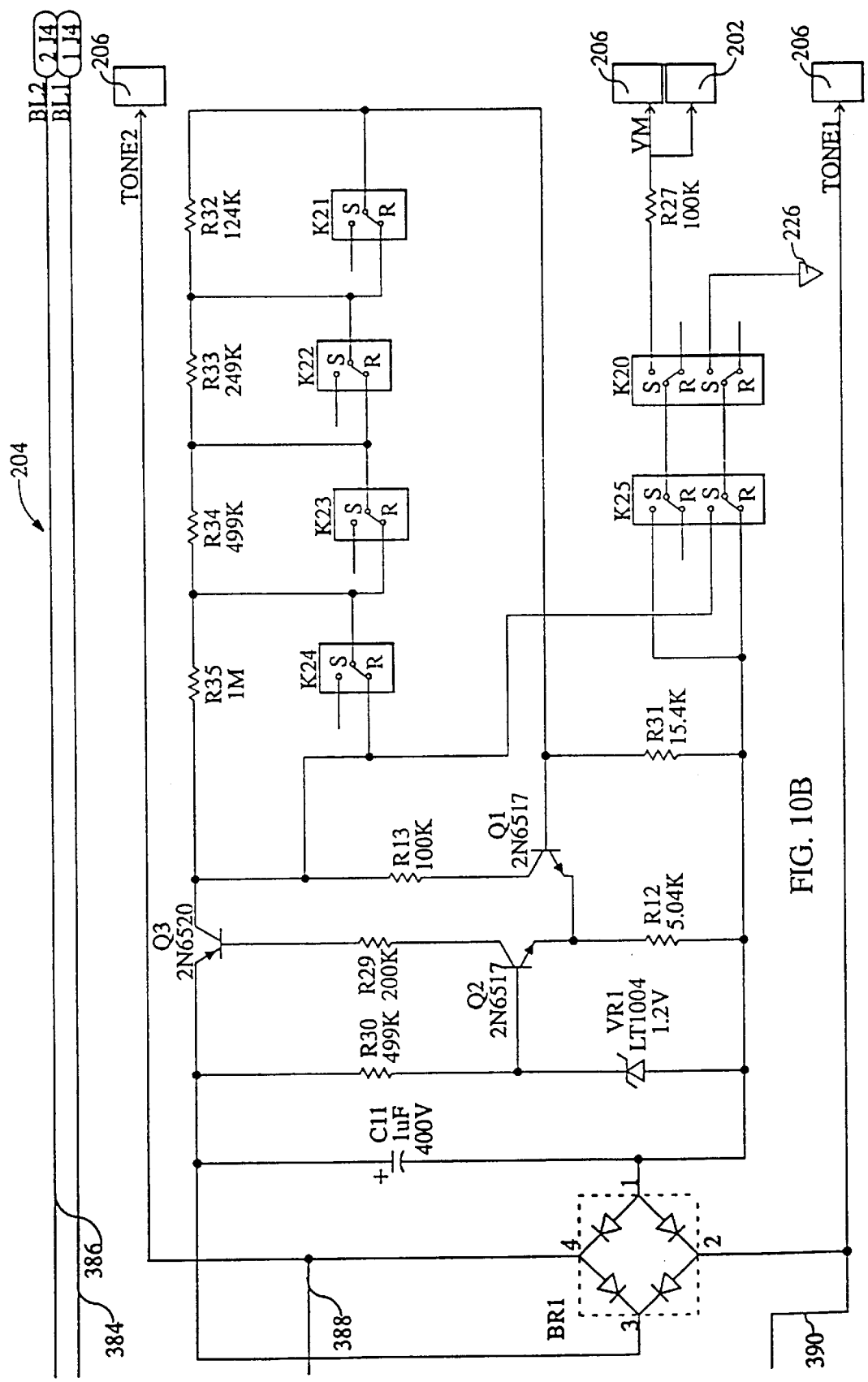

Also connected to the multiplexer chip U11 is the voltage meter signal line ("VM") from the tone generator circuit 204 shown in FIGS. 10A and 10B. The signal lines RXDR, RXDL and RXDD are DC voltage outputs from the impedance circuit 206 shown in FIGS. 11A and 11B. These signal lines are monitored by the microcomputer circuit 102 through the impedance circuit 206 to allow the analyzer 10 to perform low-accuracy DC voltage measurements. These measurements indicate whether a strong DC bias voltage is present which would block possible AC voltage and current measurements by the impedance circuit in FIG. 12B.

The option voltage signal line OPV is connected to connector J3 socket 18. The OPV line comes from the expansion portion 26. The RFLO signal line is connected to the output terminal of the amplifier UB5 of the Murray bridge circuit 211 shown in FIG. 11B and is discussed in detail below.

The resistors R42 and R43 are arranged to provide a voltage divider input to the multiplexer U11 terminal 5 to scale the voltage down to a manageable level to protect the multiplexer U11. Resistors R39 and R40 are also connected as a voltage divider input to the multiplexer U11 terminal 4.

Referring to FIG. 7B, the op-amp U14-1 provides a two-pole (12 dB) low-pass filter circuit with a cutoff frequency of about 25 Hz for filtering predominate noise existing at 60 Hz and associated harmonic frequencies (for example 50 Hz is a harmonic of 60 Hz). The output of the op-amp U14-1 is connected to a sigma-delta DC-type analog-to-digital (A/D) converter U10. The op-amp U14-1 also serves as a voltage limiter for the voltage going into the AID converter U10 by making use of the ±5 VDC connected to the power terminals of the op-amp (not shown). A suitable sigma-delta A/D converter is available from Crystal Semiconductor Corporation under the part number CS5507. The DC voltage measurements from the output terminal of the op-amp U14-1 are routed to a microcontroller U10 serial port terminal which is connected to an internal microcontroller serial bus. A secondary shift register U9 is also on the serial bus signal line ARCK to route digital instructions from the microcontroller U10 (FIG. 3A) to the digital multiplexer U11 as well as to the converter U10.

C. Tone Generator/Display Power Source

Figure 22:
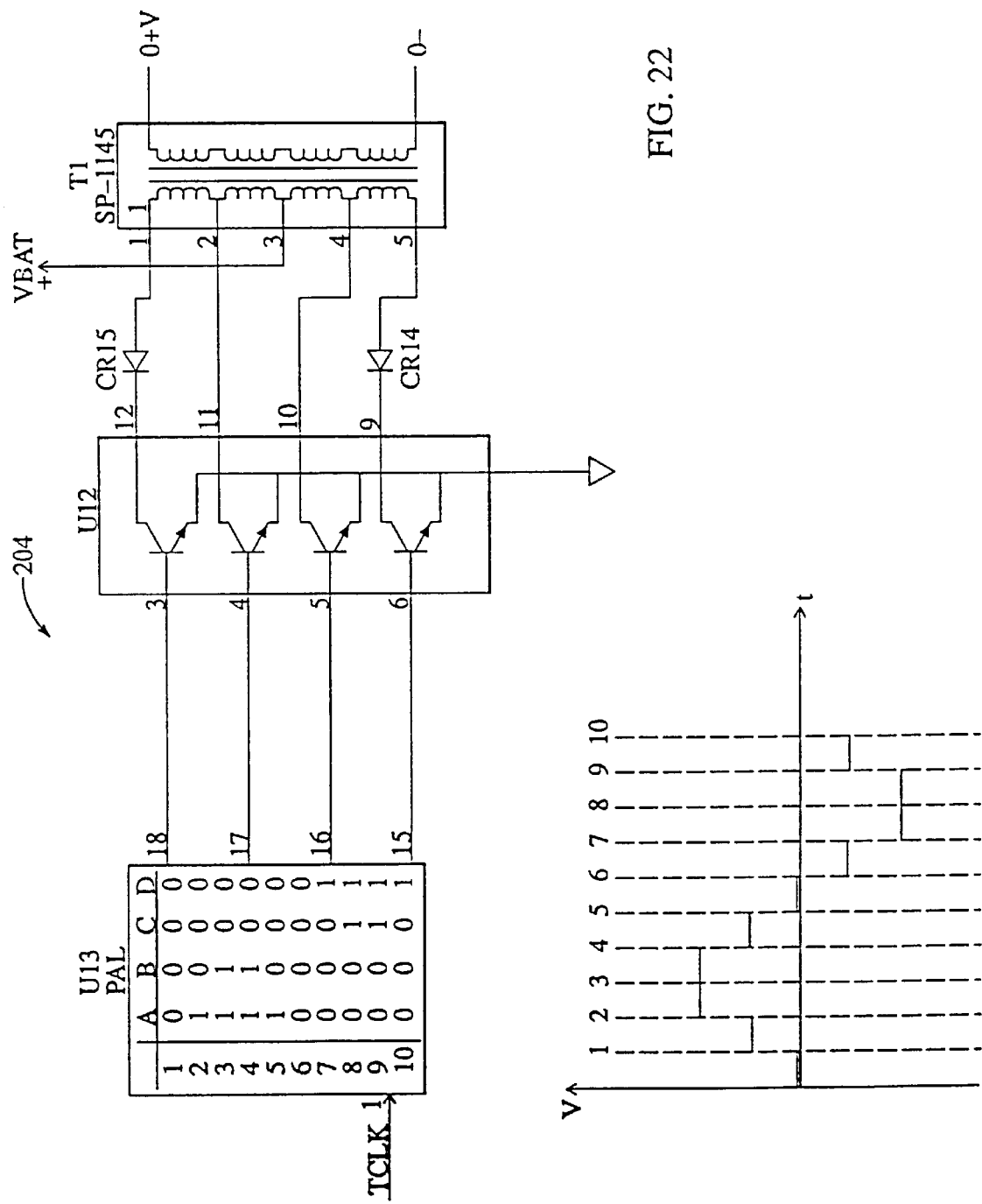
FIG. 22 is an electrical schematic representation of the tone generator of the invention having a programmable logic array with a firmware program and other hardware to generate the tone waveform.

Shown in FIGS. 10A and 10B is the tone generator/high-voltage source circuit 204. A circuit analysis representation is shown in FIGS. 22A and 22B. The tone generator/high-voltage source circuit 204 generally comprises a programmable array logic device U13, a solid-state driver U12 and a transformer T2. The PAL U13 has a firmware program which generates a divide-by-ten output circuit based on an input clock signal TCLK connected to the PAL terminal 1. The firmware is represented by the Boolean logic chart contained in the block labeled U13 shown in FIG. 22. A suitable PAL is a PAL16RB. A digital clock signal device having an output terminal is provided by an programmable internal counter timer on the microcontroller U10 to provide the clock signal TCLK signal. The TCLK signal can be adjusted through program software commands to vary the frequency of the TCLK signal to conform to particular inductive wands used for tracing the buried line pair. The frequency range required for the high power tone is from about 350 Hz to about 8500 Hz.

The transformer T1 is a center-tap variety having a core with a hysterisis. The transformer has a primary winding and a secondary winding. The primary winding has a center-tap terminal 3 and terminals 1, 2, 4 and 5. The secondary winding has a center-tap terminal left "floating" or unused and terminals 11, 10, 9, 8, 7 and 6. A suitable transformer has a core frequency response preferably greater than 8500 Hz to allow efficient energy transfer across the transformer core from the primary side of the transformer to the secondary side. Such a transformer is a SP-1145. A suitable driver is a UCN5800.

The output terminals 15, 16, 17, 18 and 19 of the PAL U13 are connected to the solid-state driver U12 terminals 6, 5, 4, 3 and 14, respectively. Through these terminal connections, the PAL U13 controls the driver U12. Responsive to the PAL U13, the driver U12 terminals 12, 11, 10 and 9, are connected to transformer T1 primary winding terminals 1, 2, 4 and 5, respectively. As shown, terminals 9 and 12 are connected in through a diode CR14 and a diode CR15, respectively, to prevent a negative over-swing voltage into the driver U12.

The power source VBAT is a direct current power supply connected to the center-tap terminal between terminals 3 and 4 of the primary winding of the transformer T1. As illustrated in FIG. 10A, the center-tap of the transformer T1, between terminals 3 and 4 of the primary winding, is connected to the voltage source VBAT through series resistor R36 and inductor L1. The voltage VBAT is provided by the six C-Cell batteries 232 discussed earlier.

The center-tap terminal between terminals 8 and 9 of the secondary winding of the transformer is floating or open to configure the secondary winding with a scaleable "binary" weighting structure through secondary winding terminals 6, 7, 8, 9, 10 and 11, respectively. That is, terminals 6 and 7 provide a weight of $2^0$; terminals 7 and 8 a weight of $2^1$; terminals 8 and 9 a weight of $2^2$; and terminals 9 and 10 a weight of $2^3$. Therefore, the winding turns ratio for the secondary winding output is adjustable to provide a selectable signal amplitude of the generated tone waveform which is adjustable from about 12 VAC to about 180 VAC.

As shown in FIG. 10A, control circuit means of the tone generator/high voltage source circuit 204 comprises the PAL U13 and the driver U12 which is connected to the transformer T1. The output terminals of the control circuit activates a predesignated sequence of the plurality of terminals of the primary winding. The terminals of the primary winding are activated when a current is allowed to flow between at least two terminals. As discussed above, the control circuit means has an input terminal electrically connected to the output terminal of a digital clock signal device. The clock signal device comprising in part the microcontroller U10 having an internal programmable counter timer to provide the TCLK signal line.

Shown in FIGS. 22A and 22B, the firmware contained within the PAL U13 requires that the primary winding terminals be in an "off" state in the first step. In the second step, the /OUT1 terminal 12 is activated, allowing current to flow from the center-tap terminal 3 to the transformer T1 terminal 1. In the third and the fourth step, the /OUT1 and /OUT2 terminals 12 and 11, respectively, are activated simultaneously to increase the amount of voltage across the primary side of the transformer. In the fifth step, the /OUT1 terminal 12 is activated again and the /OUT2 terminal 11 is deactivated. In the sixth step, the primary winding terminals are off. The method is repeated with the /OUT3 and /OUT4 terminals 10 and 9, respectively in the same order to produce the general waveform illustrated in FIG. 22B.

The inductive characteristics of the transformer T1 core provide a smoothing effect which produces a very efficient waveform. The waveform generated by the tone generator circuit 204 has a worst case distortion at the 9th or 11th harmonic at −21 dB, resulting in a waveform distortion of less than ten-percent. The tone generator circuitry 204 provides a sixty-five power percent efficiency rating whereas conventional sine wave generators have an efficiency of only forty-percent. A further advantage of the tone generator 204 is that it generates a large energy signal using only a power source consisting of commonly available C-Cell sized batteries 232.

Referring to FIG. 10A, the circuitry comprising transistors Q5 and Q4 provides a current limiter for the driver U12 to prevent a current overload situation. When the current through Q4 approaches a magnitude to damage the driver U12, then transistor Q5 is turned "on" to allow current to now across its collector and emitter terminals. The emitter terminal of the transistor Q5 is connected to the CLEAR terminal 1 of the driver U12. When transistor Q5 is turned "on" the CLEAR terminal is activated, placing the driver U12 in an inactive state which effectively deactivates the tone generator circuitry 204.

The tone generator 204 is used by a craftsperson to determine the path and depth of a buried line pair. A high-powered tracing tone is used in conjunction with an inductive wand, such as model C-8046A available from Communications Technology Corporation. The tone has a voltage of about 150 VAC and about 350 to about 8500 Hz. Locating the line pair fault is accomplished by following the line pair while observing the tone level on the wand receiver's meter. The line pair path location is typically indicated by a distinct null directly over the line pair and a strong signal on either side of the line pair path. Since a fault will attenuate some of the tone, the craftsperson observes a sharp drop in tone level, indicative of the exact fault location.

When the high power tone generator 204 is in use, the craftsperson leaves the analyzer 10 connected to the line pair while he traces the line fault using an inductive wand (not shown). Thus, there is no need for the backlight of the display 36 to be powered because it is not used when the analyzer 10 is in this mode. To further compact the size of the line pair analyzer 10, the tone generator 204 also provides power to the backlight of the electroilluminesent display 36 through the BL2 and BL1 signal lines which connect to the connector J4 sockets 1 and 2, respectively. The display 36 requires about an 80 VAC at 400 to 500 Hz power source.

To provide power to the display 36, the secondary side of the transformer T1, shown in FIG. 8, is connected from the secondary winding terminals 10 and 11 to relay K26 to toggle the mode of operation for the tone generator circuit. When relay K26 is "set," through a command from the microcomputer circuit 102, then the waveform produced by the tone generator 204 is routed to and powers the backlight of the display 36.

The tone generator circuitry of FIGS. 10A and 10B also is available for providing a scaleable high DC voltage for use in, as an example, the Murray bridge circuit 211 used to detect parallel faults. The tone generator circuitry also provides a linear voltage regulation circuitry. Referring to 10B, shown is a linear voltage regulator comprising the transistors Q1, Q2 and Q3. The relays K21-2, K22-2, K3-2 and K24-2 are controlled by the microcomputer circuit 102 to change the voltage divider ratio of the resistors R32, R33, R34 and R35 against resistor R31. As the AC voltage is increased by the microcomputer circuit 102, the DC voltage is similarly increased to follow the AC voltage increase. The simultaneous increase or decrease of the AC and DC voltages generate the linear characteristics of the regulator provided by the transistors Q1, Q2 and Q3. The scaleable DC voltage available from the voltage divider configuration ranges from about 10 VDC to about 150 VDC. The regulator circuit is connected to the relay K25 as shown. Relay K25 is controlled by the microcomputer circuit 102 to change the polarity of the DC voltage. As shown, the DC signal is floating, or not grounded, when the relay K20 is "reset." When the relays K21, K22, K23 and K24 are "reset," the secondary winding of the transformer is used to provide the tone outputs onto the TONE1 signal line and TONE2 signal line.

D. Digital Potentiometer

Figure 11A:
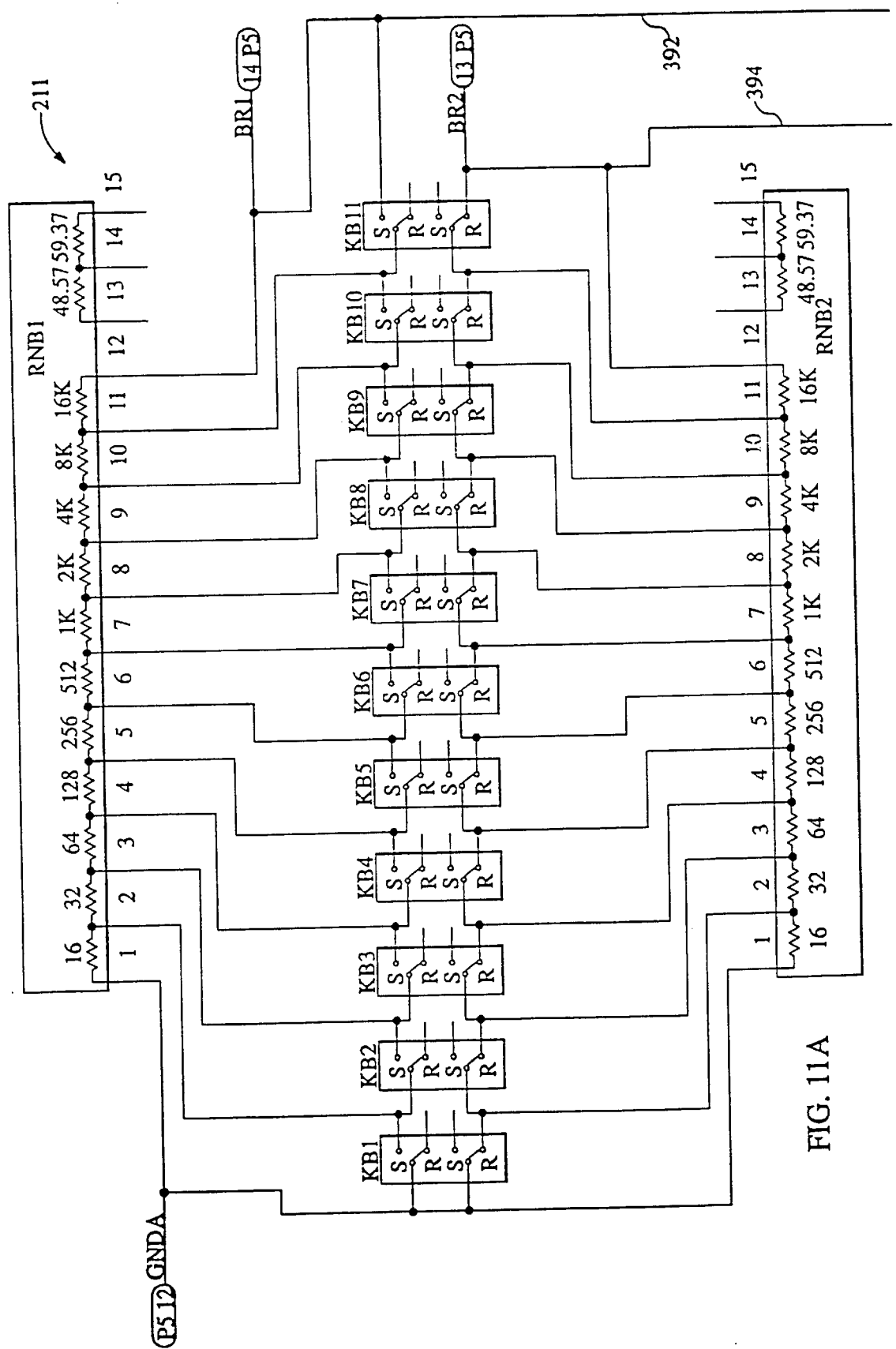
FIGS. 11A–11B are an electrical schematic illustration of the interconnections of the resistor bank, switching relays and other elements of the digital potentiometer of the invention.
Figure 11B:
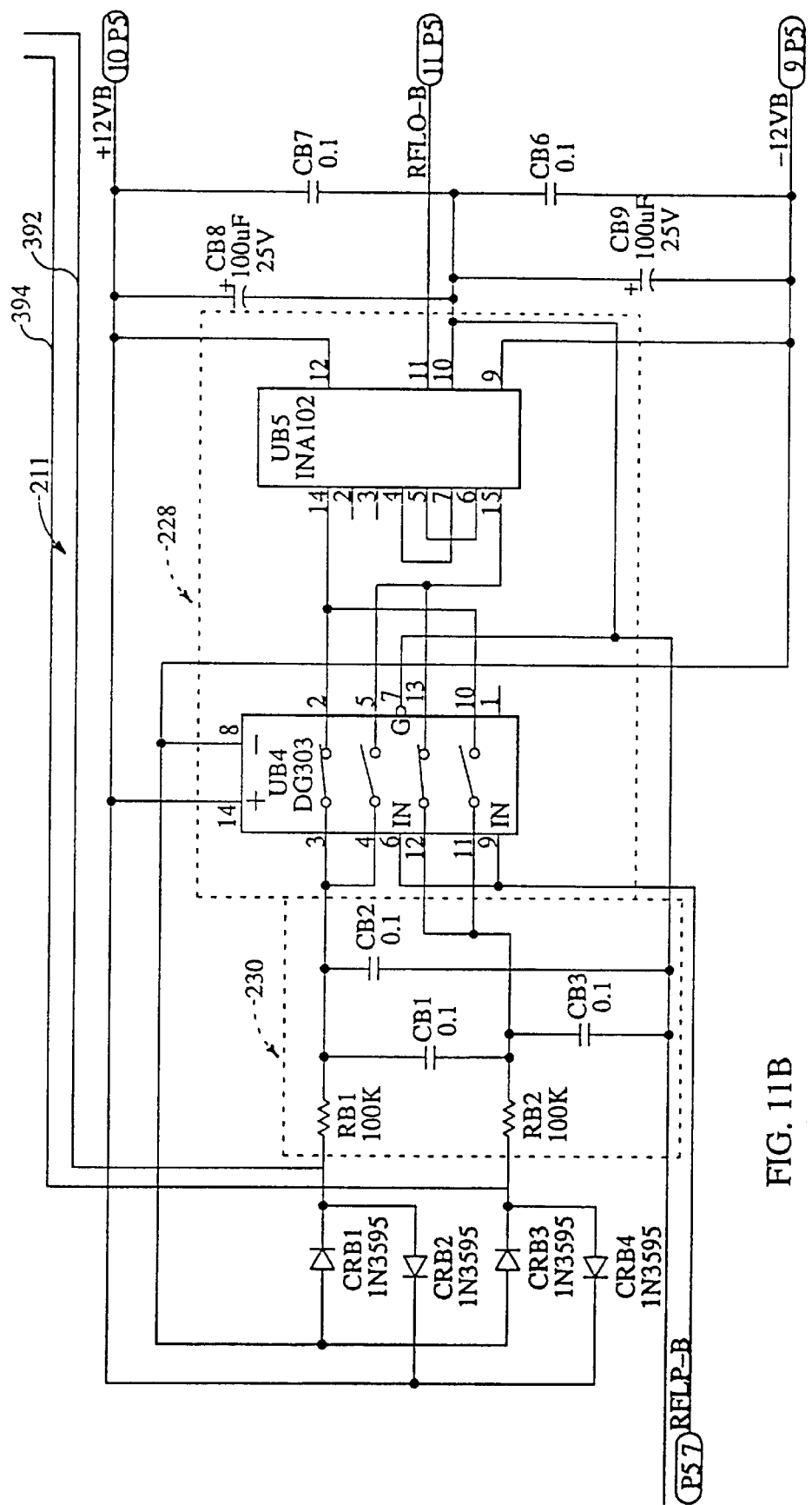
Figure 23:
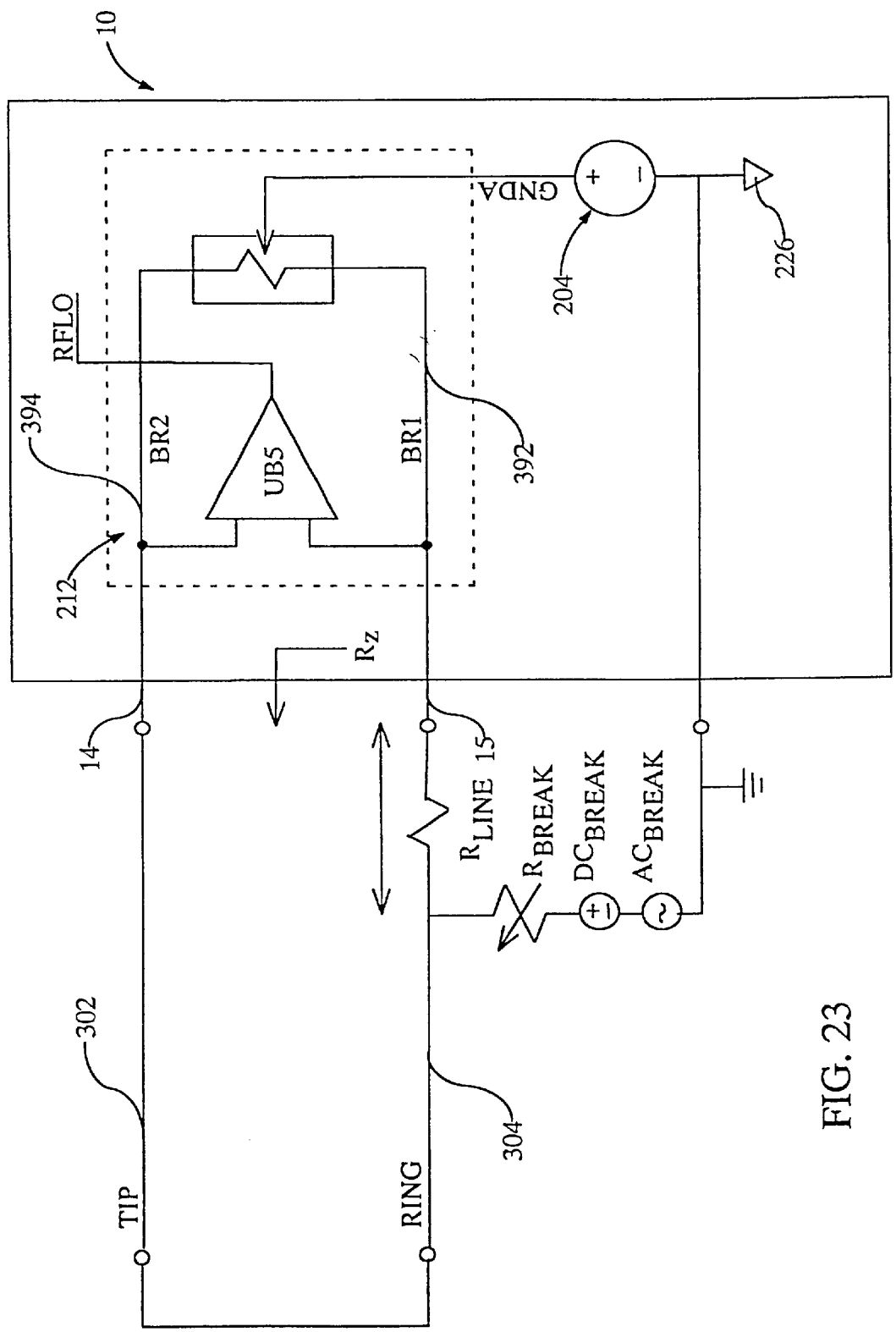
FIG. 23 is an electrical schematic representation of the potentiometer circuit employed in a Murray bridge configuration.

Referring to FIGS. 11A, 11B and 23, a digital potentiometer 212 is used in a variation of a Murray bridge circuit 211 for an automated determination of the distance from the near end of a connected line pair to a parallel fault $R_{BREAK}$. Circuits such as the Murray bridge are used to determine the impedance elements of a line pair by comparing the voltages or currents of the line pair with the known impedances and component values within the analyzer 10. Generally, bridge circuits are an arrangement of electrical dividers for comparing the equivalent circuits of impedance elements.

Figure 13A:
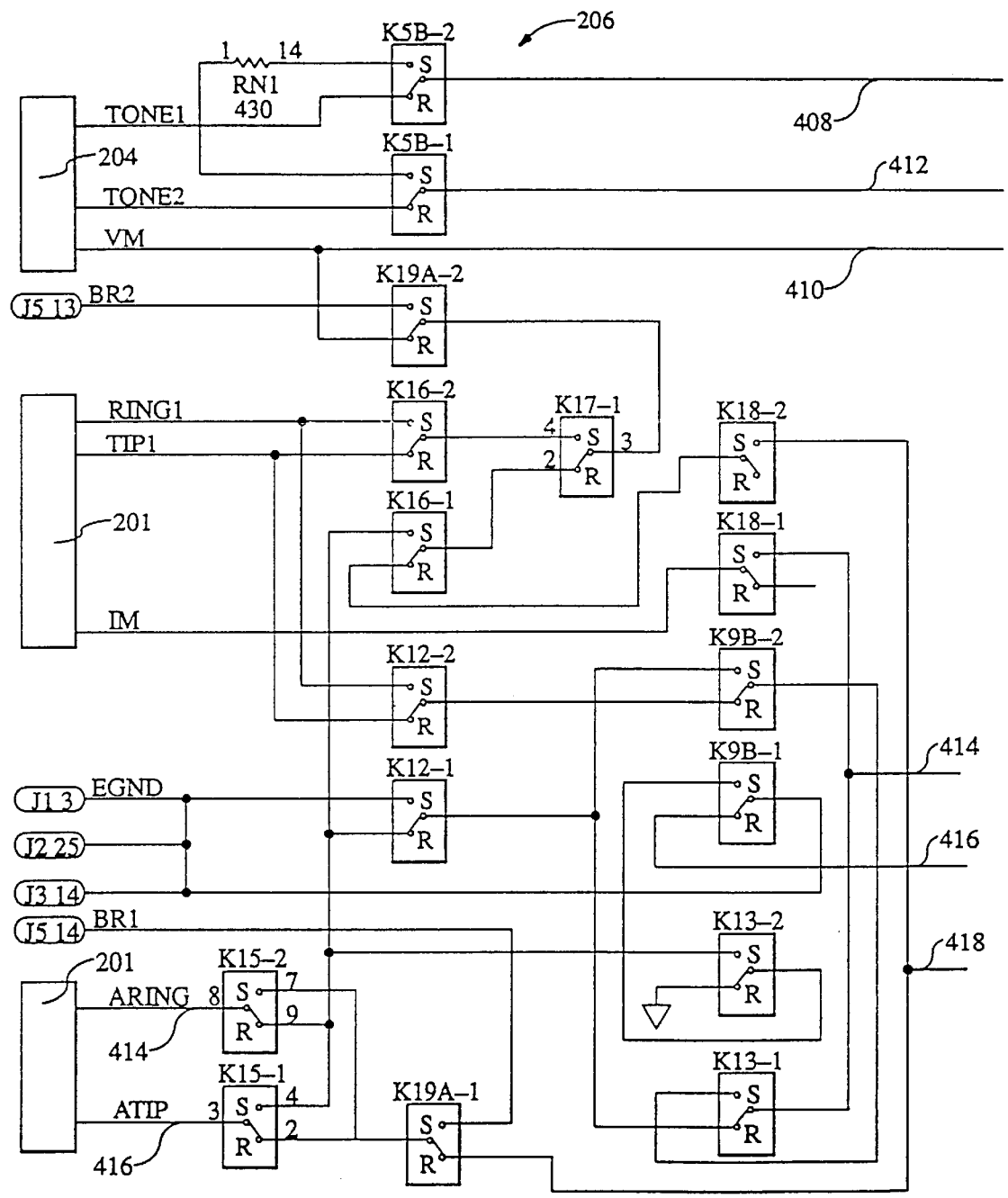
FIGS. 13A–13B are an electrical schematic illustration of the interconnections of the interfacing elements to the line pair and the AC voltage measurement circuitry and other elements of the impedance circuit of the invention.

The digital potentiometer 212 is provided to the analyzer through connection to the BR1 and BR2 signal lines as shown in FIGS. 10A and 13A. Relays K19A-1 and K19A-2 are used to connect the bridge circuit 211 to the ARING and ATIP signal lines 414 and 416, respectively, and to route to the primary test pair through signal lines TIP and RING 302 and 304, respectively, as shown in FIG. 8A The interface of the microcomputer circuit 102 to the bridge circuit 211 uses as few relays as possible because each relay is a resistance source that can adversely affect the precision of the measurement.

Referring to FIG. 23, shown is an electrical model of a Murray bridge circuit 211 connected across the tip 302 and ring 304 lines of the line pair for analysis using test lead connectors 14 and 15. The parallel fault resistance $R_{BREAK}$ is modeled as a variable resistance with $DC_{BREAK}$ and $AC_{BREAK}$ voltage characteristics. For example, water in the line pair would create the fault shown. Such faults are the most common and the most difficult to diagnose with present technology.

The opposite or far end of the leg and ring legs is shorted, or strapped, either by a craftsperson placing an conductor between the legs or by remote using a Smart Strap attached on the opposite end. As shown, the analyzer 10 drives a high voltage onto the ground lead 226 of about 150 VDC, provided by the tone generatorlhigh voltage source circuit 204. The source impedance of the 150 VDC voltage source is about 100 kohms so it is very current limited to protect the analyzer 10.

The digital potentiometer 212 has a first and a second connection terminal BR1 and BR2, respectively, and a wiper terminal designated as GNDA. A plurality of multiple contact switching relays are also provided as shown. Each of the relays are of the type described above with regard to the analog-to-digital interface.

Referring to FIG. 11A, the wiper terminal, designated by the socket P5 pin 12, is connected to the high voltage source 204 through the GNDA signal line 226. The potentiometer resistance terminals 392 and 394, respectively, are connected to the input terminals 3, 4, 11 and 12, of the multiplexer UB4. The configuration of a first and a second series-resistance bank RNB1 and RNB2 provides a microcontroller-controllable potentiometer providing a predetermined selection of resistance values across the first and the second connection terminals in dependence upon the contact connections of the plurality of relays. The potentiometer 212 has up to two-thousand forty-eight "taps," or values, of thirty-two kilohms per tap. More values can be had as desired with other hardware. The resistance banks RNB1 and RNB2 each has a plurality of discrete resistances which can be replaced with discrete resistor components but would unnecessarily increase the size and the weight of the analyzer 10. The first and the second connection terminals BR1 and BR2, respectively, and the first and the second series-resistance banks RNB1 and RNB2, respectively, are so arranged constructed and interconnected as to selectably provide a predetermined selection of resistance values across the first and the second connection terminals in dependence upon the contact connection conditions of the plurality of relays.

The Murray bridge circuit 211, shown in FIGS. 11A and 11B, further comprises a differential amplifier circuit 228 having a multiplexer UB4, a high-gain amplifier UB5 and a low-pass filter circuit 226 having protection diodes CRB1, CRB2, CRB3 and CRB4. The protection diodes are connected to the ±12 VDC supply lines to limit the input voltage to the bridge circuit 211. The low-pass filter circuit 226 comprises series resistors RB1 and RB2 which feed into parallel capacitors CB1, CB2 and CB3 to form a simple low-pass filter circuit connected to the input terminals of the multiplexer UB4. A suitable analog multiplexer is a DG303. A suitable high gain amplifier available under the part number INA102.

The differential amplifier circuit 228 provides an offset cancellation across the output terminals of the low-pass filter 230 for nullifying offset voltages. The multiplexer UB4 reverses the polarity of the input provided by the signal lines BR1 and BR2 392 and 394, respectively, for offset nullification. Voltage offsets occur due to the presence of the low-pass filter circuit of op-amp U14-1, the high gain of the amplifier UB5, the analog multiplexer U11 and the sigma-delta A/D converter U10 shown in FIGS. 8A and 8B.

Offset nullification is effected by using a binary search of digitally "moving" the wiper of the potentiometer 212 until the voltage is minimized, then the input signals BR1 and BR2 are measured through the differential input circuit 228. The multiplexer UB4 reverses the polarity of the incoming signal lines to make another measurement. The result obtained at the output of the amplifier UB5 is the difference between these two measurements, which is twice the voltage that appears at the input terminals of the multiplexer UB4. That is, offset errors are subtracted from each other and are therefore nullified. This ensures that a valid input is being measured by the microcontroller U10.

The output terminals 2, 5, 10 and 13 of the multiplexer UB4 are routed to the input terminals of the high gain amplifier UB5, which is configured for a gain of 1000. The output terminal 11 of the amplifier UB5 is connected to the RFLO-B signal line. The RFLO-B signal line is connected to an input terminal of the multiplexer U11 shown in FIG. 8A The RFLO signal line is monitored by the microcontroller U10 for a zero or null voltage output. Once a "false," or zero, reading is made, then the potentiometer circuit 212 has acquired the ratio designation as set forth by the resistance value produced by the potentiometer circuit 212.

To make a high impedance fault measurement, a high DC voltage source is provided by the tone-generator/high voltage source circuit 204 through the VM signal line shown in FIG. 10B. The high voltage source is connected to the system ground 226. The system ground in turn is connected to earth ground EGND shown in FIG. 13B. The potentiometer circuit 212 is adjusted by the microcomputer circuit 102 until the microcomputer circuit 102 detects a null, or minimal, voltage which the microcomputer circuit 102 detects as a binary "false" value. When the minimum voltage point is obtained, the resistance value of the entire length of the line pair is known. Also determined is the value of the resistance $R_{LINE}$ to the point of the fault based on the resistance per mile value of the line pair cable used. With the Murray bridge nulling method to obtain the minimum output voltage, obtained is the ratio necessary to minimize the voltage output onto the RFLO signal line. The ratio is multiplied by the impedance $R_Z$ looking into the line pair to obtain the resistance value $R_{LINE}$, which can be multiplied with the resistance per mile of the line pair.

The problem resolved with the dual-polarity measurement comprising the multiplexer UB4 is to cancel the offset errors caused by the high gain amplifier.

E. Impedance Measurement Circuit

Referring to FIGS. 12A, 12B, 13A and 13B, shown is the impedance measurement circuit 206. The analysis available is (1) a voltage source current analysis, (2) a terminated source voltage analysis, (3) DC voltage measurement, and (4) an AC voltage measurement. A telephone line pair diagnostics circuit uses a transformer T2 as a platform to provide three diagnostic functions: (1) stressed longitudinal balance analysis, (2) power circuit influence analysis, and (3) a phantom trace tone. Additionally, the relays shown provide a dual-channel configuration having a left channel and a right channel for use in, for example, three-terminal measurements and a mono-channel configuration for use in, for example, two-terminal measurements. The variable resistance network 216 is used to provide a matching impedance of the analyzer 10 with telephone line pairs having different electrical parameters. For example, standard telephone line impedances for a plain old telephone set ("POTS") is typically 600 ohms. Other impedances available from the variable resistance network 216 for other line pairs having different electrical characteristics are 135 ohms, 900 ohms and 1200 ohms.

1. Dual-Channel Mode

When the relays K5A (comprising relays K5A-1 and K5A-2) and K4A (comprising K4A-1 and K4A-2) are "reset," the analyzer 10 operates in a stereo mode having right and left channels. Each channel has a devoted waveform generator and meter having a source from the CODEC U9 CDLOUT terminal 41 and CDROUT terminal 40 (FIG. 4A). The stereo mode is typically utilized when performing three-terminal measurements.

2. Mono-Channel Mode

A mono-channel mode is implemented to perform two-terminal measurements or other diagnostic tests requiring only a single waveform source. When relay K5A is "set," the right channel of the impedance measurement circuit 206 is grounded and the feedback path of the op-amp U15-3 is tied to the left channel through series resistor RN2 terminals 1 and 16. The non-inverting terminal of the op-amp U15-3 is connected to the system ground 226 through the relay K5A-2. Both channel paths are connected to the op-amp U16-2 input terminals as shown in FIG. 12B, to produce the from the op-amp U16-2 output terminal the signal CDLAUX1. The CDLAUX1 signal is conveyed to the CODEC U9 terminal 42 through connector J2, socket 3. If a differential mode is required then relay K9A-1 and K9A-2 would be "set" to disconnect the circuit from the ground reference 226 shown in FIG. 13B, thereby allowing the paths to "float" with respect to each other.

3. Voltage Source Current Analysis

Figure 12A:
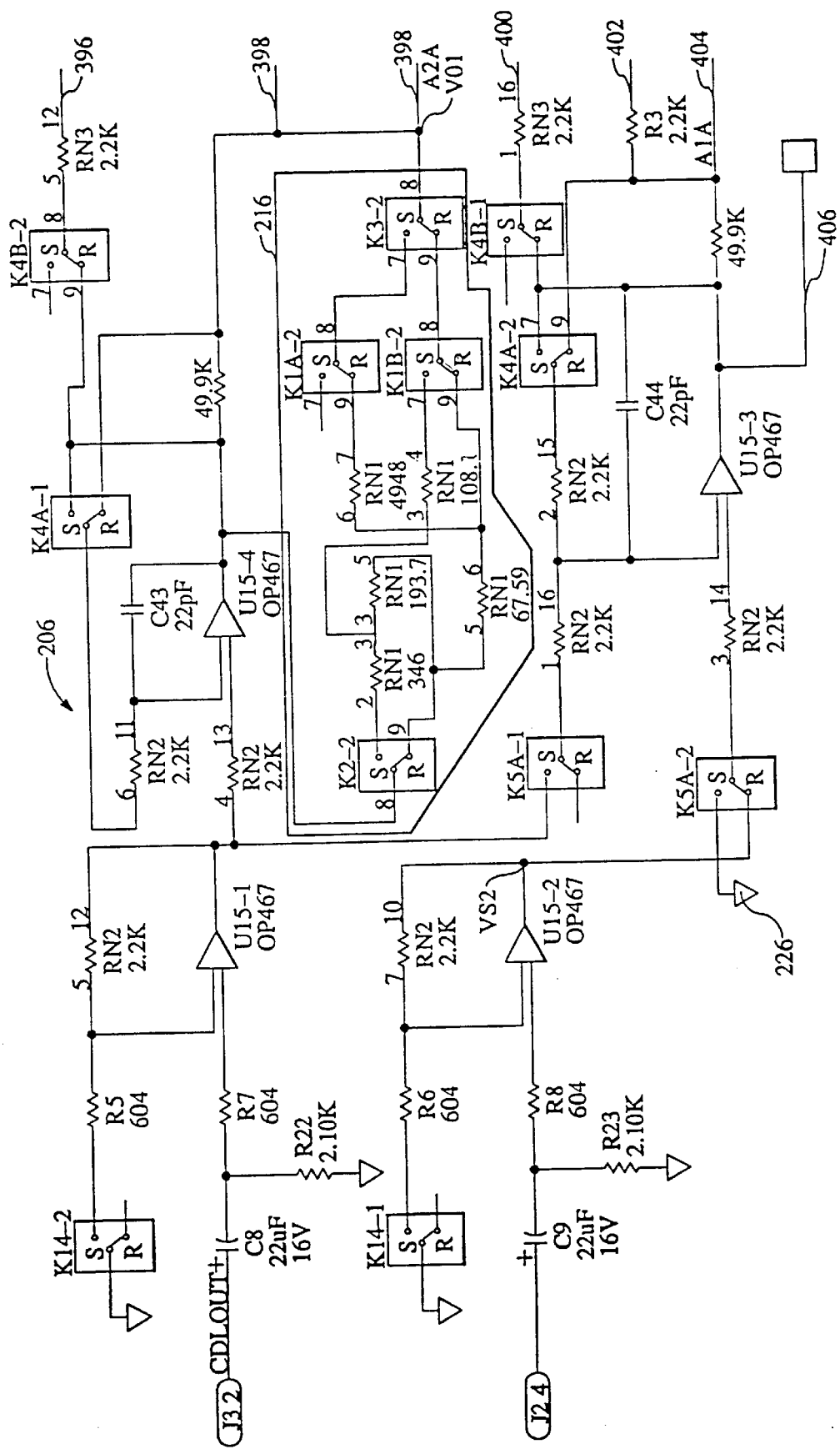
FIGS. 12A–12B are an electrical schematic illustration of the interconnections of the op-amp measurement circuits, interconnecting relays, and other elements of the impedance circuit of the invention.
Figure 12B:
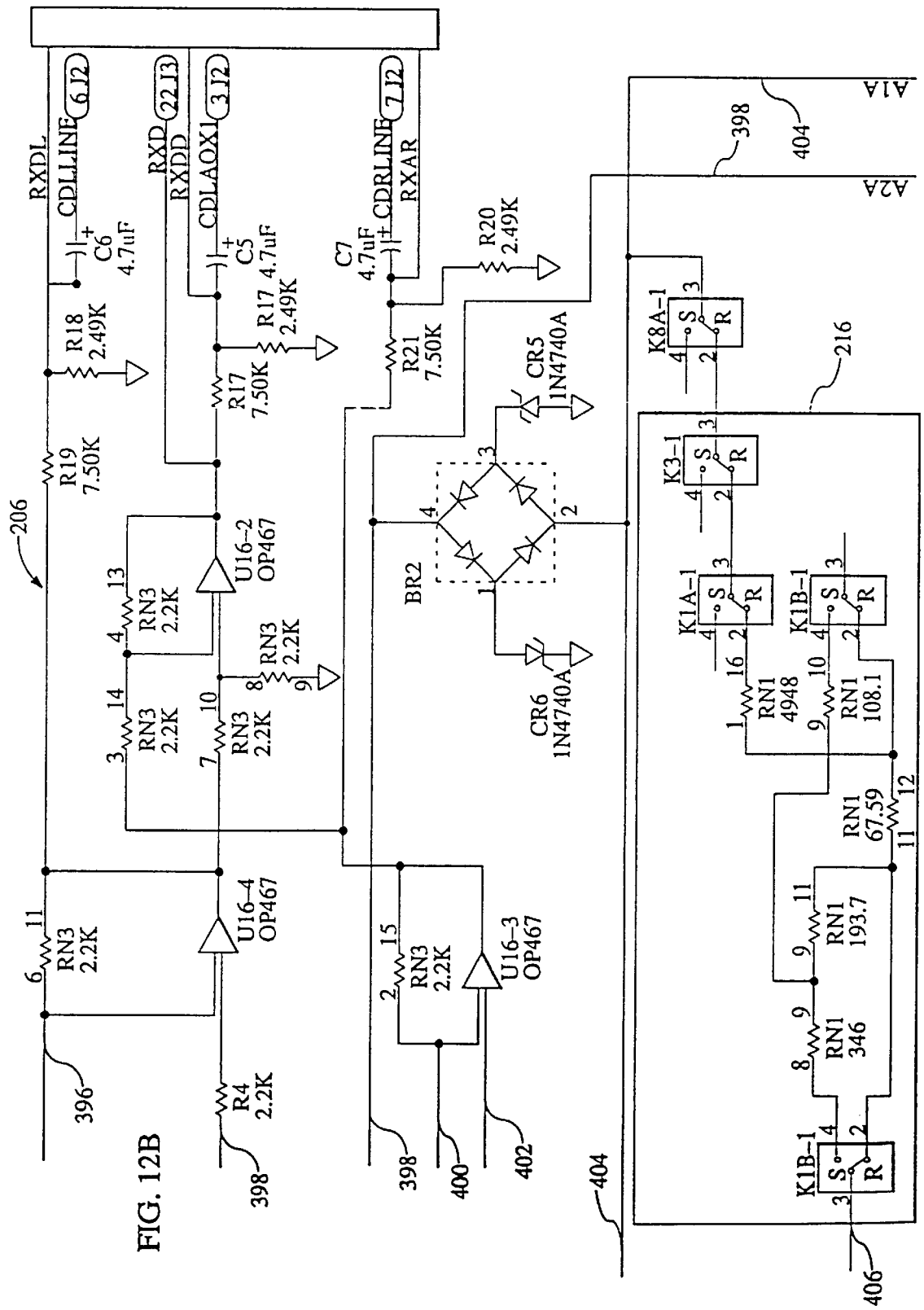
Figure 21A:
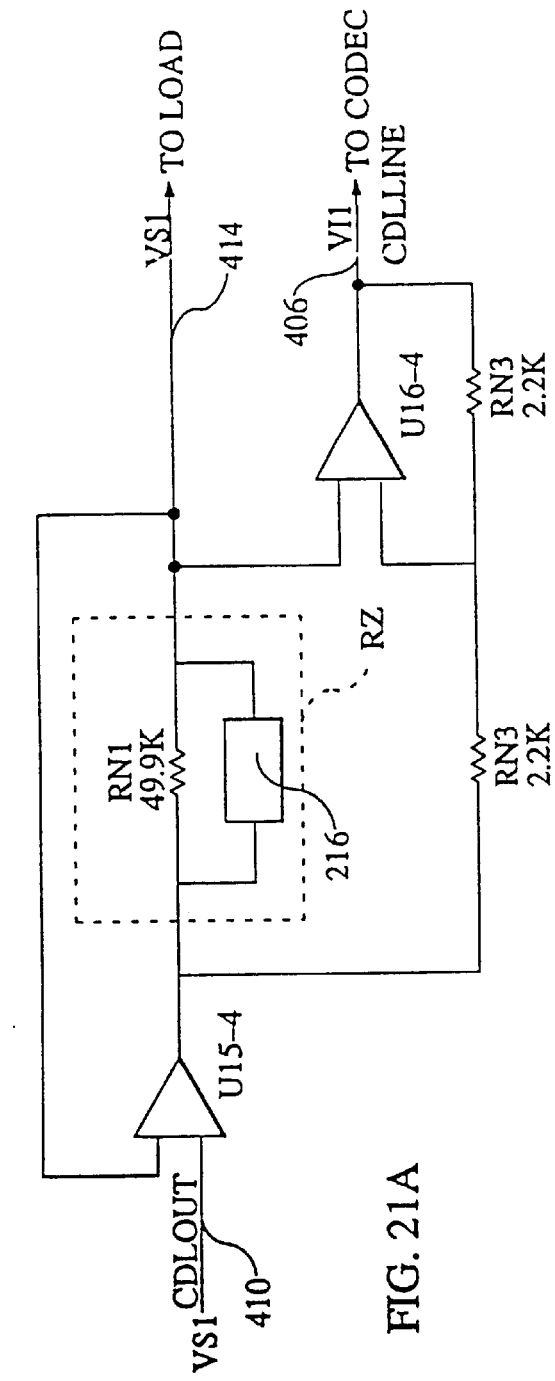
FIGS. 21A–21B are an electrical schematic representations of the differing operational amplifier circuit configurations available to diagnose the line pair.

Referring to FIGS. 12A, 12B and 21A, shown is a voltage source current analysis circuit ("voltage source circuit"). For clarity, FIG. 21A illustrates a voltage source circuit of only one channel. The voltage source circuit is present when relays K4A-1, K4A-2, K5A-1 and K5A-2 are "reset." The left and the right channels of the voltage source circuit comprises operational amplifiers ("op-amps") U15 and U16 which are available under the part number OP467. Referring to FIG. 21A, shown is a two-stage circuit comprising op-amps U15-4 and U16-4. Referring to FIG. 12A, the op-amp U15-4 is generally configured as a "voltage follower" circuit with a capacitor C43 connected in the negative feedback loop of the op-amp U15-4 and a resistor RN2 with a first terminal 11 connected to the negative terminal of the op-amp U15-4. A second terminal 6 of the capacitor C43 is connected to the relay K4A-1. In this configuration, as stated above, relay K4A-1 is in a "reset" state, connecting the second terminal 6 of the resistor RN2 through the resistor R1 to the output terminal of the op-amp U15-4. The capacitor C43 and resistor RN2 serve preliminary filtering functions to limit the influence of electrical noise.

Source voltages $V_{S1}$ and $V_{S2}$ are provided by the CODEC U9 CDROUT terminal 41 and CDLOUT terminal 40, respectively. Shown in FIG. 12A, the voltages are provided through connector J3 sockets 2 and 4. After passing preliminary amplification stages provided by the op-amp U15-1 for the left channel and the op-amp U15-2 for the right channel, the voltages $V_{S1}$ and $V_{S2}$ are supplied to the ATIP and ARING signal lines 416 and 414, respectively, shown in FIG. 13A. When a line pair or a load is not connected to the analyzer 10, the voltages are as follows:

$V_{O1}=V_{f1}=V_{S1}$ $V_{O2}=V_{f2}=V_{S2}$ where the source voltages $V_{S1}$ and $V_{S2}$ are provided by the CODEC U9 CDLOUT terminal 40 and CDROUT terminals 41, respectively. When a line pair or a load is connected to the analyzer 10, the voltage characteristics of the voltage source circuit is as follows:

$V_{O1}=V_{S1}$;

$V_{O2}=V_{S2}$;

$$V_{f1} = V_{S1}\left(1 - \frac{\frac{(R1)(R_Z)}{R1+R_Z}}{R_{load}}\right)$$

$$V_{f2} = V_{S2}\left(1 - \frac{\frac{(R2)(R_Z)}{R1+R_Z}}{R_{load}}\right)$$

As when there is not a load present on the analyzer 10, the source voltages $V_{S1}$ and $V_{S2}$ are output to the ATIP and ARING signal lines 416 and 414, respectively, as shown in FIG. 13A These source voltages each propagate a reflected waveform which is measured as the voltage values $V_{f1}$ and $V_{f2}$, shown in FIGS. 12B and 21A Resistance Rz is provided by the variable resistance networks 216 in parallel with the left-channel resistor R1 and the right-channel resistor R2, respectively, shown in FIG. 12A As disclosed above, the variable resistance networks are controllable by the microcontroller U10. The value $R_{load}$ is the impedance value of the line pair as perceived by the analyzer 10. Note that the voltage source circuit cannot measure line pairs having low load impedances because $R_{load}$ would approach a value of "zero," resulting in a $V_{f1}$ and $V_{f2}$ voltage measurement approaching infinity which is meaningless. A parallel short from one leg to the other would be one form of a low load impedance.

The voltage values $V_{f1}$ and $V_{f2}$ are conveyed over the sampling lines 396 and 400 to the CODEC U9 CDLLINE terminal 30 and CDRLINE terminal 27, respectively. The CODEC U9 converts the sampled analog values to a digital format for further processing by the microcontroller U10 executing a computer program implementing Fast Fourier Transform (FFT) analysis, shown in the microfiche appendix.

4. Terminated Source Voltage Analysis

Figure 21B:
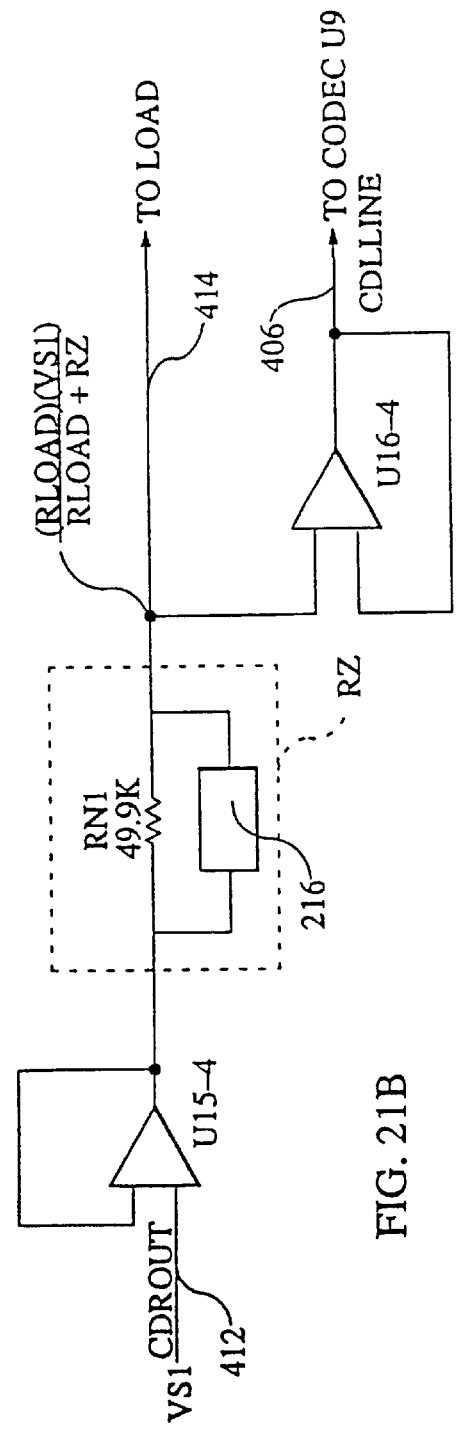

When a low load impedance is measured on the telephone line pair, a terminated source voltage analysis circuit ("terminated source circuit") as shown in FIG. 21B is used. A low load impedance can be caused by a short across the tip and the ring legs 302 and 304, respectively, or when the craftsperson is attempting to measure the actual wire resistance of a line pair leg. The terminated source circuit implements the mono-channel mode for two-terminal measurements. Referring to FIG. 12A, the terminated source circuit is provided when the relays K4A-1, K4A-2, K4B-1 and K4B-2 are "set." The resulting circuit provides the following mathematical values when no load is connected to the analyzer 10:

$V_{O1}=V_{f1}=V_{S1}$ $V_{O2}=V_{f2}=V_{S2}$

When the line pair, or load, is connected to the analyzer 10, the mathematical values of the circuit is as follows:

$$V_{f1} = \left(\frac{R_{load} * V_{S1}}{R_{load} + R_Z}\right)$$

$$V_{f2} = \left(\frac{R_{load} * V_{S2}}{R_{load} + R_Z}\right)$$

The source voltages $V_{S1}$ and $V_{S2}$, are equal to $V_{f1}$ and $V_{f2}$ and are output to the ATIP and ARING signal lines 416 and 414, respectively, as shown in FIG. 13A These source voltages each propagate a reflected waveform which is measured as the voltage values $V_{f1}$ and $V_{f2}$, shown in FIG. 12B and 21A. The resistance $R_Z$ is provided by the variable resistance networks 216 in parallel with the left-channel resistor R1 and the right-channel resistor R2, respectively, shown in FIGS. 12A and 12B. As disclosed above, the variable resistance networks are controllable by the microcontroller U10. The value $R_{load}$ is the impedance value of the line pair as perceived by the analyzer 10.

Relays K15-1 and K15-2 are provided for changing the polarity of the ARING and ATIP signal lines as needed as dictated by the microcontroller U10 (FIG. 3A). The output of op-amp U16-2 shown in FIG. 9B provides a differential receiver output to the CODEC U9 signal input CDLAUX1 terminal 39 (see FIG. 4A) when the relays K5A-1 and K5A-2 are "set" (see FIG. 9A).

5. DC Voltage Measurements

Figure 19A:
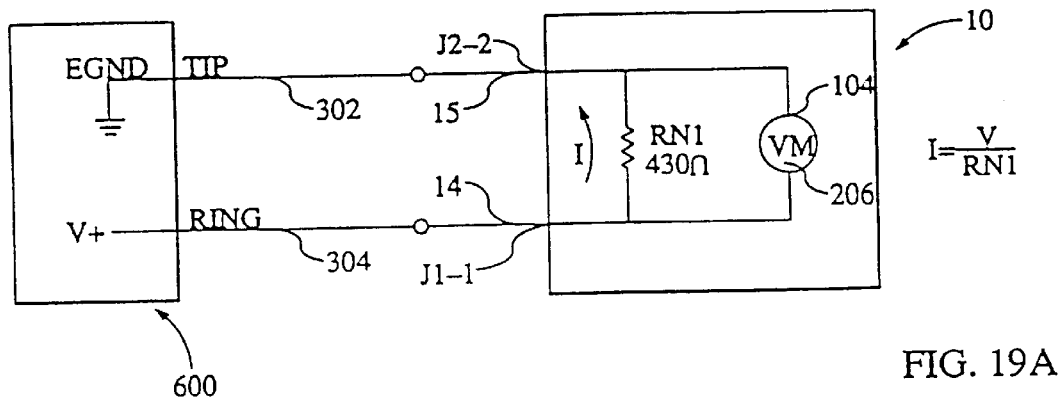
FIGS. 19A–19C are an electrical schematic representation of current loop analysis tests of the connected line pair with the far end connected to a telephone central office.
Figure 19B:
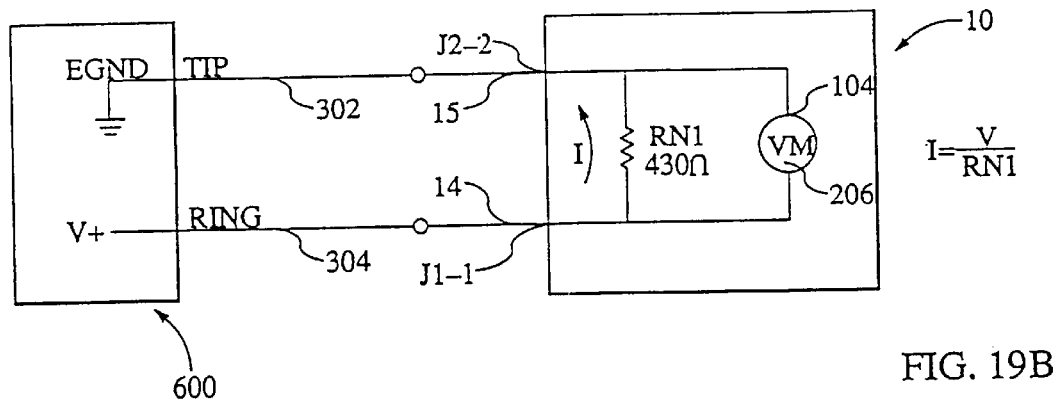
Figure 19C:
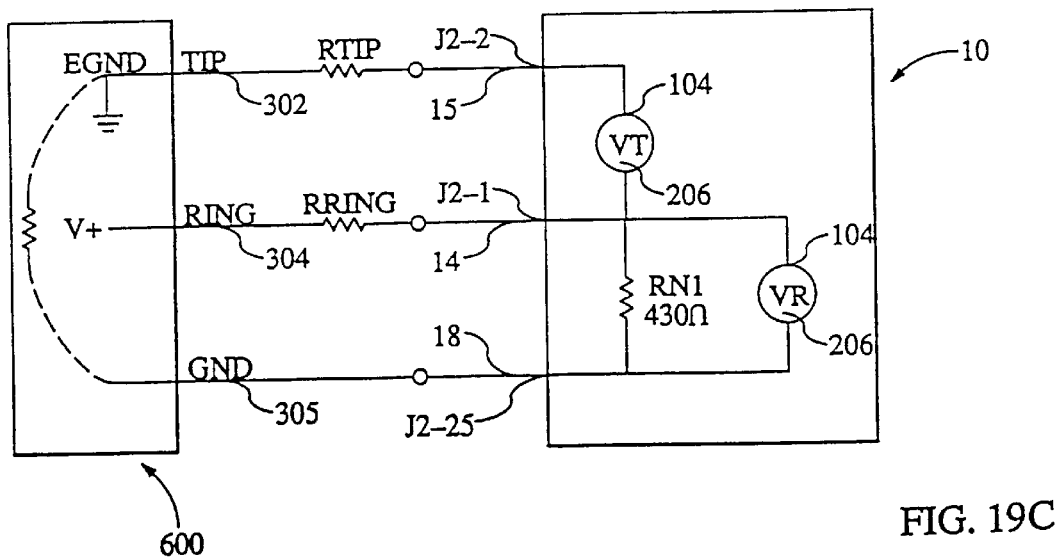

Referring to FIG. 13A, the relays K19A, K16 and K17 can electrically reposition the 430 ohm resistor RN1 having terminals 1 and 14 shown in FIG. 13A, in various configurations with the line pair for measuring loop current between the legs of the line pair, as shown in FIGS. 19A, 19B and 19C. Loop current is measured by terminating an activated line pair with the 430 ohm resistor RN1. The opposite end or far end of the line pair is connected to the central office telephone switch 600. The DC loop current is calculated using Ohm's Law.

Referring to FIG. 19A, shown is the measurement of the loop current I across the precision resistor RN1 shown in FIG. 13A The meter $V_M$ is provided by the meter/waveform circuit 104 and the impedance measurement circuit 206 to acquire the value of the loop current I.

Referring to FIG. 19C, the "ground ohms" value of the line pair is calculated by electrically placing the 430 ohm resistor RN1 between the ring leg and the ground leg. The ground ohms value is the amount of resistance between the line ground and the earth ground resistance $R_{GROUND}$ which establishes the suitability of the ground connection. To obtain the ground ohms measurement, a meter $M_1$ or $M_2$ is electrically connected between the tip leg 302 and the ring leg 304 of the line pair. The 430 ohm resistor RN1 is connected to ground. At the telephone central office, the tip leg 302 is, as a matter of course, connected to a certified Earth Ground (EGND) terminal. Also at the telephone central office there is about a fifty-two volt battery voltage connected to the ring leg 304 of the line pair. Two measurements are made, first, a voltage measurement across the tip and the ring legs 302 and 304, respectively, is made to obtain voltage measurement $V_T$. The second measurement is the voltage $V_R$ across the resistor RN1. The "ground ohms" is the ratio of the voltage $V_T$ divided by voltage $V_R$ multiplied times the resistance value of resistor RN1.

6. AC Voltage Measurement

Figure 13B:
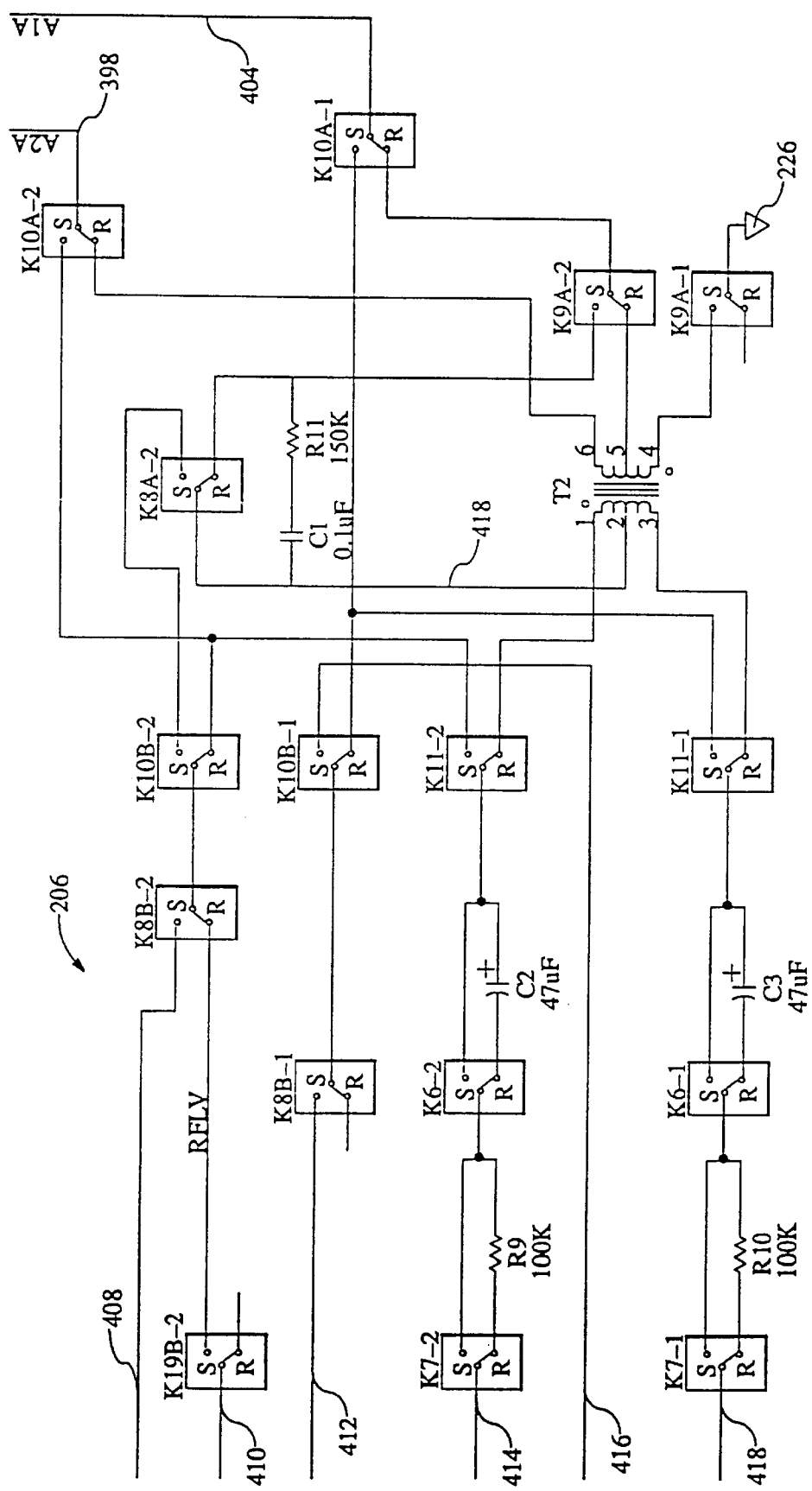

Referring to FIG. 13B, resistors R9 and R10 are connected through the relays K6-1, K6-2, K11-1, K11-2, K10A-1 and K10A-2 to form a voltage divider with the variable resistance networks 216 for the left and the right channels, respectively. The voltage dividers reduce the voltage of the reflected signals or reduce the voltage of voltage measurements made on the line pair, for example, in the DC voltage measurement circuit 202 tests. The transformer T2 is disconnected through relays K10A-1, K10A-2, K9A-1 and K9A-2. The voltages are measured through the CODEC U9 (FIG. 4A) and are processed through a microcomputer program having FFT algorithms and executed on the microcomputer circuit 102.

7. Telephone Line Pair Diagnostics Circuit

Referring to FIGS. 13A and 13B, shown is a telephone line pair diagnostics circuit. A simplified electrical schematic of the circuit is illustrated in FIGS. 20A–20C. The diagnostics circuit uses a transformer T2 as a platform to provide three diagnostic functions: (1) a stressed longitudinal balance circuit analysis, (2) power circuit influence circuit analysis, and (3) a phantom trace tone.

Two connection terminals are provided to connect the telephone diagnostics circuit through the ARING signal line 414 and the ATIP signal line 416 to the line pair ring and tip legs 302 and 304, respectively. A plurality of multiple contact switching relays K8A-1, K8A-2, K9A-1, K9A-2, K10A-1 and K10A-2 are provide configure the circuit elements shown in FIG. 13B in the diagnostics circuits of FIGS. 20A–C. Each relay has a first and a second contact connection condition and at least one activating element controllable by the microcomputer means shown in FIGS. 3A–3C for changing the relays between the first and the second contact connection conditions. The connection terminals connected to the ARING signal line 414 and the ATIP signal line 416, the stressed longitudinal balance circuit analysis, the power influence circuit analysis and the phantom trace tone, and a DC voltage measuring means and the transformer T2 are so arranged constructed and interconnected as to selectably provide a predetermined selection of any of said means electrically connected to said connection terminals in dependence upon the contact connection conditions of the plurality of relays.

Referring to FIG. 13B, the transformer T2 has a primary winding, a secondary winding and a core having predetermined hysterisis characteristics. Each winding has a center-tap terminal 2 and 5, respectively, a first terminal 1 and 6 respectively, and a second terminal 3 and 4, respectively. The first terminal 1 of the primary winding is electrically connected through the relays K11-2, K6-2 and K7-2 to the ARING signal line 414. The second terminal 3 of the primary winding is electrically connected through relays K11-1, K6-1 and K7-1 to the ARING signal line 414 and to the ATIP signal line 416. The second terminal 4 of the secondary winding is electrically connected to the system ground 226 through the relay K9A-1. The first terminal 6 of the secondary winding is electrically connected to the CODEC U9 through the CDLLINE signal line terminal J2, socket 6. This connection allows the CODEC U9 to receive and process the measurement voltage values.

a) Stressed Longitudinal Balance Analysis

Referring to FIGS. 20A and 20C, shown is a means incorporating the transformer T2 for performing a stressed longitudinal balance analysis. A stressed longitudinal balance analysis compares the resistive properties of one line pair leg to the other line pair leg. The two legs are supposed to have the same electrical characteristics because they are generally equal lengths of wire having the same metallic composition. Such an analysis informs the craftsperson of an imbalance typically caused, for example, by a resistive fault. If the legs of the line pair are "equal," then the line pair is "balanced," indicating that no faults are present in the line pair.

Shown in FIG. 20A is a simplified circuit representation of the analysis functions available through use of the transformer T2 (see FIG. 10B). Through relay K9A-1 a system ground 226 connection is made to the transformer secondary winding terminal 4. A connection to the left channel is established by the relay K10A-2 through the signal line A2A. Relays K10A-1, K9A-2 and K8A-2 when set, connect the right channel path to the center-tap terminal 2 of the transformer T2. A 600 ohm matched impedance is applied through the parallel combination of resistor RN1 and the variable resistance network 216 in each channel to accommodate the use of only one-half of the line pair.

Referring to FIG. 9A, a stimulus, or longitudinal, waveform is created and conveyed by the CODEC U9 through the CDROUT terminal 41 and CDLOUT terminal 40 onto the right and the left channel line 412 and 410, respectively. The stimulus waveform is the "stressed" portion of the analysis. Earth ground (EGND) must be connected to the system ground 226 through relays K9B-1, K9B-2 and K13 as shown in FIG. 13A The earth ground lead EGND is connected to the relays K12 and K9.

Referring to FIG. 20A and 20C, the balanced, or metallic, signal level is measured relative to the longitudinal source signal to determine the balance level of the line pair. The measurements are taken from the CDLLINE signal line 406 and the CDRLINE signal line 408. Although a fault might be indicated, the longitudinal balance test does not indicate the form of the fault in the line pair. Other tests such as the Murray bridge circuit analysis 211, discussed above, can be used to determine the location and the form of the fault within the line pair.

With the same circuit configuration described, a double-ended stressed balance can be performed with the use of a Smart Strap or other device capable of transmitting a longitudinal source waveform from the opposite end of the line pair. The double-ended stressed balance test is capable of measuring the balance of the length of the line pair instead of just one end, discussed above.

b) Power Influence Analysis

Referring to FIGS. 20A and 20B, shown is a means incorporating the transformer T2 for performing a power influence analysis. An unstressed balance test enables the analyzer 10 to obtain the power influence value-also known as longitudinal noise-of nearby power circuits on the tip and the ring legs 302 and 304, respectively. Referring to FIGS. 12A, 12B and 13B, relays K8A-1 and K3-1 disconnect the variable resistance network 216 from the right channel of the circuit to produce a line impedance at the right channel at 50 kohm provided by the resistor R2. The left channel of the circuit is provided with a line impedance of 600 ohms.

Relays K10A-1 and K10A-2 is "reset" to route the transformer T2 center-tap terminal 2 into the impedance measurement circuit 206 shown in FIGS. 12A, 12B, 13A and 13B. Relays K8A-1 and K8A-2 are "set" to couple the right channel circuit through series capacitor C1 and resistor R11 shown in FIG. 10B. The total impedance of the right, or longitudinal, channel is a total of 200 kohms provided by resistors R2 (FIG. 12A) and R11 (FIG. 13B). No input is provided by the CODEC U9 onto either channel, thereby effectively grounding the input terminals of the right and the left channel. The magnitude of metallic noise can be measured from the left channel at the CDLLINE input terminal 30 of the CODEC U9. The magnitude of the power influence can be measured from the right channel circuit at the CDRLINE input terminal 27 of the CODEC U9. The two results are compared to provide a noise balance ratio.

c) Phantom Locating Tone

Referring to FIG. 20A, shown is a means incorporating the transformer T2 through line 418 for broadcasting a phantom tone onto the line pair such that on-going communications are not interrupted. When a line pair is in use, the craftsperson tracing the line seeks to prevent disrupting a subscriber's telephone service by applying a phantom tone provided by the tone generator/high voltage source circuit 204 or by the meter/waveform generator circuit 104 onto the electrical shielding layer surrounding the line pair. The electrical shielding layer is typically connected to ground 305 to reduce the influence of electrical noise on the line pair. The tone generator circuit 204 transmits a high voltage tone onto the line pair ground through the center tap terminal 2 of the transformer T2 through the relays K8 and K10 into a "set" mode. The lower power waveform produced by the meter/signal generator circuit 104 is used when a line pair is being traced through a routing box.

III. OPERATION

A. Waveform Generator/Meter & Characteristic Analysis

The analyzer 10 has adds two levels of "depth" to conventional measurement devices. Many conventional units use single dimension analysis whereas the analyzer 10 performs: (1) multi-terminal measurements on the tip leg 302 and the ring leg 304 which allow a separation of the characteristics that are seen between the individual nodes without the series/parallel combinations having individual effects which are not predictable; and (2) the use of multiple frequencies with the complementary circuits adds a "third dimension" to look into the line pair at both the series electrical model for series resistances and the parallel electrical model for the capacitance values and shorts or faults of the line pair.

With the apparatus and method disclosed herein, line pair measurements can be performed with one application of a multi-frequency waveform signal where conventional apparati uses single-frequency waveforms. Multi-frequency measurements allow the microcomputer circuit 102 to search both the parallel and the series impedance analysis characteristics of the line pair which are compared absolutely and relative to each impedance series and parallel analysis model. That is, if the capacitances within the line pair appear to be matched but a series resistance within the line pair is measured at the same time and does do not reasonably match, the probability is that there is a series resistive fault from a burned wire, a corroded wire or a bad connection. Prior measurement devices would have required further analysis before determining a fault is present.

The telephone line pair analyzer 10 measures the electrical characteristics of a telephone line pair having a first, or ring, leg, 302, a second, or tip, leg 304 and a ground 305. The first line connector 14, the second line connector 15 and the ground line connector 16 are connected to the legs respectively to interface the analyzer 10 with the line pair.

Referring to FIGS. 2, 3A–3C and 4A, waveform generator means including a microcomputer means having electronic memory means is provided by the meter/waveform circuit 104 and the microcomputer circuit 102. The meter/waveform circuit 104 generates a first source waveform $V_A$ and a second source waveform $V_B$. The first source waveform $V_A$ is transmitted over the first line connector 14 and the second source waveform $V_B$ is transmitted over the second line connector 15.

The analyzer 10 generates AC source waveforms $V_A$ and $V_B$ to analyze the capacitance characteristics of the line pair while also being able to obtain information about the series resistance of the line pair. For example, if a connector is going bad in a line pair, a series fault having a high resistance appears on the line pair. The analyzer 10 can detect this fault, whereas a conventional, one-dimensional, capacitance measurement device could not detect this fault without requiring the craftsperson to travel to the far end of the line pair, terminate it, and return to conduct a stressed balance analysis.

Figure 14:
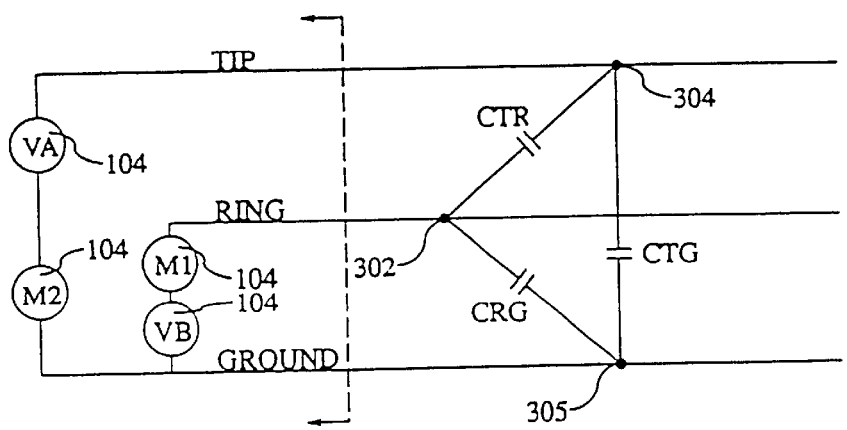
FIGS. 14 is an electrical model schematic of a telephone line pair from the end connected to the invention, the line pair having a tip, ring and ground with associated virtual capacitances between the associated legs.

The analyzer 10, in addition to other functions, implements a traditional three-terminal measurement method to obtain accurate measurements of the line pair characteristics as shown in FIGS. 14 and 15. The electrical models illustrate the line pair capacitances $C_{TG}$, $C_{RG}$ and $C_{TR}$ and resistances $R_{TIP}$, $R_{RING}$ and $R_{GROUND}$ as discrete components for clarity. The three-terminal measurement shown is advantageous over devices implementing simply two-terminal measurements technology. Two-terminal measurement methods are severely limited due to an inherent inability to detect low Resistance line faults. That is, the line pair characteristics may be within an acceptable tolerance range but may not in fact be operational due to negligible resistances caused by corrosion or line fracture faults. The effectiveness of the three-terminal measurement is increased with the use of a multi-frequency waveform and FFT signal processing.

The two-terminal measurement is further limited by its inability to overcome parasitic influences from non-vacant line pairs, floating pairs or grounded pairs onto the line pair being tested. To compensate, a hypothetical error factor is used in an attempt to account for these parasitics. Nevertheless, digital communication systems require strict operational characteristics else the line pair is not usable-two-terminal measurements are unable to deliver such exacting measurements. However, the analyzer 10 implements a two-terminal measurement capability through the use of the mono-channel mode.

1. Signal Generation & Processing

Figure 16:
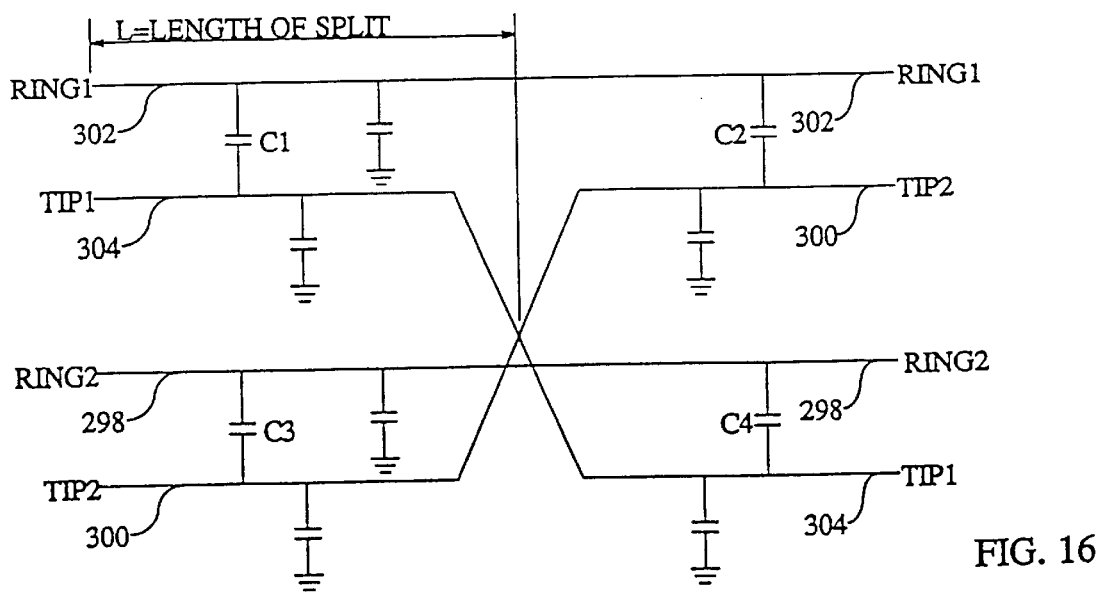
FIG. 16 is an electrical schematic representation of an improperly spliced line pair resulting in a line pair split.

The cable analyzer 10 provides automated line pair characteristic analysis testing using a multi-frequency phase controlled source waveforms to provide the sources $V_A$ and $V_B$. The Flash PROM U1 (see FIG. 3B) contains a software twittle table used to generate the waveform necessary for the spread spectrum complex impedance analysis of the connected line pair. The resulting digital representation of the multi-frequency waveform has 1024×8 samples ($2^{10}$ samples of one-byte size) which is stored in the SRAM U6L and U6U. The lowest frequency that can be represented is the sample rate of the CODEC U9 divided by 1024. Using the CODEC U9 of the present device allows a lower threshold frequency of about 5 Hz Upon a command from the craftsperson to perform an analysis of a connected line pair, the stored digital representation is fed to the CODEC U9 which converts the digital representations to AC waveforms $V_A$ and $V_B$ which are output on the CDLOUT and CDROUT terminals 40 and 41, respectively, as shown in FIGS. 4A, 9A and 16, onto the tip leg 302 and the ring leg 304 of the line pair connected through the test leads 14 and 15. The earth ground lead 18 is connected through the relays K12 and K9 for connection to the analyzer system ground 226.

The relays K14-2 and K14-1, respectively, determine the gain of the op-amp to U15-1 and U15-2 for the source waveforms $V_A$ and $V_B$. When set, the output gain of the circuitry embodied in the op-amps U15-1 and U15-2 is approximately four. The remainder of the relays act as multiplexers responsive to the microcomputer circuit 102 to selectably connect the line pair to the desired test circuitry contained in the analyzer 10.

The waveform $V_A$ comprises at least two frequencies $f_a$ and $f_b$ which is transmitted to the tip leg 302 of the line pair and waveform $V_B$ comprises at least one frequency $f_b$ which is transmitted to the ring leg 304 of the line pair. Suitable waveforms are dictated by the mathematical representations:

$$V_A = A(\sin(2\pi f_a) + \sin(2\pi f_b)) \quad V_B = A\sin(2\pi f_b)$$

"A" represents the amplitude of the waveform, which is dictated initially by the output parameters of the CODEC U9. The amplitude can be increased or decreased by additional subsequent circuitry. The operations can be performed with only two frequencies to obtain the operational parameters shown in FIGS. 14 and 15. The analyzer 10 employs four different frequencies for adding a depth dimension to the line pair analysis to perform fault detection and location analysis along the length of the connected line pair. Suitable waveforms are dictated by the mathematical expressions:

$$V_A = A(\sin(2\pi f_a) + \sin(2\pi f_b) + \sin(2\pi f_c) + \sin(2\pi f_d)) \quad V_B = A(\sin(2\pi f_a) + \sin(2\pi f_b))$$

The frequencies $f_a$, $f_b$, $f_c$, and $f_d$ used in the $V_A$ and $V_B$ waveforms are from about 15 Hz to about 200 Hz in accordance with standard signal transmission principles. The frequency of 60 Hz and associated harmonics (e.g., 50 Hz, 60, 100 120, 150, 180, 200, 250) need to be avoided if operating in the United States due to the use of a 60 Hz carrier frequency in high tension power transmission. The analyzer 10 uses the following frequencies for general analysis of the line pair: 35 Hz and 135 Hz for tip-to-ground and ring-to-ground analysis; and 40 Hz and 140 Hz for tip-to-ring analysis. Higher frequencies cause line pair inductances to become an issue and are necessarily avoided.

Each transmitted source waveform $V_A$ and $V_B$, respectively, propagates a first reflected waveform and a second reflected waveform over the first and the second line or test lead connectors 14 and 15, respectively. The reflected waveforms are received and processed through the impedance circuit 206 illustrated in FIGS. 12A, 12B, 13A and 13B. The reflected waveforms are conveyed to connector J2 sockets 3 and 6, accordingly, shown in FIG. 12B.

Meter means including the microcomputer means having electronic memory means is provided by the microcomputer circuit 102, the meter/waveform circuit 104, the impedance measurement circuit 206 and the DC voltage measurement circuit 202 shown in FIGS. 2, 3A–3C and 4A The meter means receives the first and the second reflected waveforms through the first and the second connectors. The meter means processes and converts the first and the second reflected waveforms into a digital form stored in the electronic memory means embodied by SRAM U6L and U6U, respectively.

From the connector J2 sockets 3 and 6, the signal lines are connected to the meters M1 and M2. The meters are embodied in the right and left channels of the CODEC U9 input terminals. The LLINE terminal 30 represents the meter M1 and the RLINE terminal 27 represents the meter M2. The LAUX1 terminal 39 represents the meter used when the analyzer 10 is in mono-mode or differential mode.

A microcontroller program implementing Fast Fourier Transform (FFT) algorithms is executed on the microcomputer circuit 102 of the meter means to process the converted signal data for frequency domain signal analysis, as shown in the microfiche appendix. Calculation algorithms in the program are "tuned" to the frequencies designated by the first and the second source waveforms $V_A$ and $V_B$ to obtain the impedance and phase characteristics of the line pair from the first and the second source waveforms. The program processing functions are shown in detail in the microfiche appendix which is part of this specification. When the program is tuned or set to detect the frequency $f_a$ of the first reflected waveform which responded to the source waveform $V_A$, the program processes the data to determine the $C_{TG}$ capacitance measurement. When the program is tuned or set to detect the frequency $f_a$ with respect to the second reflected waveform which responded to the source waveform $V_B$, the program processes the reflected signal data to determine the $C_{RG}$ capacitance measurement. When the program is tuned or set to detect the frequency $f_b$ of the digital representation of the second reflected waveform provides the value of $C_{TR}$ capacitance. Conventional measurement equipment requires a short across the ring 302 and tip 304 legs on the opposite end of the line pair, thereby requiring either a craftsperson at each end or one craftsperson to travel from one end of the line pair to the other to install the requisite short. The method and apparatus disclosed requires only one craftsperson to perform the desired test at one end of the line pair. As with the reactance measurement, a zero phase value is obtained which is the resistance of each leg of the line pair.

The values processed with the FFT provide the impedance information as represented in signal domain format as shown:

TABLE 1

| Element | Reactance | Complex | Phasor |
| --- | --- | --- | --- |
| resistor | 0 | R + j0 | R < 0° |
| inductor | ωL ohms | 0 + j(ωL) | ωL < +90° |
| capacitance | 1/ωC ohms | 0 − j(1/ωC) | 1/ωC < −90° |

Where R, L and C designate the values for resistance, inductance and capacitance, accordingly. Therefore, an impedance value at a 90-degree phase shift provides the capacitance of the sampled lines. Any effect of attenuation at a 0-degree phase shift is the resistance. This 0 phase shift value provides the value of resistance from a leg to ground. This measurement can be made simultaneously.

2. Wide Band Level Measurements

Root means square (RMS) voltage values are measured to determine the wide band level measurement of the line pair. The method does not use FFT program routines but normal microcontroller functions to obtain the result faster than using FFTs. Furthermore, this method does not require any offset processing and no filter functions.

A source waveform is transmitted on the telephone line pair utilizing the apparatus and method disclosed above in detail. The data received from a reflected signal is converted and processed to obtain a means value, which is a DC component which is not desired. A subsequent pass of the digital data results in the (X minus X bar)$^2$ to obtain the sum of the squares. Instead of taking the square root, a normal dB equation of 20 log(v/vref) or 10 log (v/vref)$^2$ is used to obtain the dB result.

Thus, the wide band measurement method takes a first pass to get the DC, a subsequent pass to get the sum of the squares, and process the second pass to get obtain the wide band level measurement.

3. Frequency Counter

Information also obtained with regard to the frequency of the reflected signal received by the analyzer 10. In this method, the reflected waveform data is processed to count the zero crossings once the DC offset component of the reflected waveform has been removed. From the beginning zero crossing count the amount of samples, allowing frequency to be samples divided by "zero" crossing-count times the sample rate equals the frequency. The frequency of the reflected waveform is obtained by averaging the phase width of the reflected waveform and divide this value with the average of the zero crossings to provide an accurate frequency measurement (using floating decimal functions) of the reflected waveform.

4. Load Coil Count Method

A method of determining the number of load coils on a telephone line pair comprises transmitting a source waveform having a plurality of frequencies onto a line of the telephone line pair. The source waveform stimulates a reflected signal. The reflected waveform is received by the analyzer 10 where the reflected waveform is converted into a digital representation which is stored in an electronic memory device. The digital representation is processed with a program which is executed on the a microcomputer means to sum the number of minimum and maximum presented impedance slopes in the reflected waveform. The number of minimum and maximum impedance slopes present in the reflected waveform relate to the total number of load coils on the line pair.

The load coil count method utilizes the software program (shown in the microfiche appendix) executed on the microcomputer circuit 102 to process and obtain a FFT output rendered from the reflected waveforms to count the number of load coils or inductors in the line pair. To make this measurement, the analyzer 10 places the CODEC U9 into a mono-mode for transmission of the a single source waveform $V_A$. The source waveform $V_A$ transmitted contains a large amount of frequencies. A suitable number of frequency values is three-hundred and twenty ranging from about 200 Hz to about 6200 Hz. The spacing of the frequencies is approximately 20 Hz. Connected to the analyzer 10 is the near-end of the line pair. The line pair's near-end capacitance value measured to a load coil and the far-end capacitance value measured along the length of the line pair after the load coil determines the frequencies at which that load coil is both in-phase and out-of-phase with any particular frequency. The near-end capacitance and the far-end capacitance provide an electrical signature in which there is a minimum and a maximum presented impedance reflected back to the analyzer 10 in the reflected waveform. Using a software program executed on the microcomputer circuit 102, FFT's separate the frequencies after the reflected waveform is received, converted and processed by the analyzer 10. A load coil or inductor count is obtained by counting the number of changes from the fluctuation of impedance levels from minimum to maximum, also known as "upslopes." The number of upslopes represents the number of load coils or inductors installed in the line pair. Using this method, the number of load coils can be obtained in about two-tenths of a second or less. Prior test devices using a single frequency sweep methodology would take almost three minutes to complete this test.

B. Fault Detection

When the parameters are outside the designated range, or the line pair is malfunctioning although line pair analysis tests indicate that the line pair is within operational tolerances, the cause is typically a fault or a line split (due to improper splicing) in the line pair. Tests are performed to determine the magnitude and the location of the fault. The potentiometer circuit 212 shown in FIG. 10 is used to zero out the voltages through use of Ohm's Law:

$$V=IR$$

V is the voltage, I is the current in the circuit, and R is the variable resistance provided by the potentiometer. The reflected waveform is compared against a reference signal for determining the reactance of the line.

Since a dual-channel transmission is not required to perform fault measurement analysis, relay K5A-1 is set to configure the circuit into a differential drive so that now the resulting waveform comes out as one-channel driving differentially. In differential mode current monitoring cannot be performed, only voltage monitoring.

Figure 17:
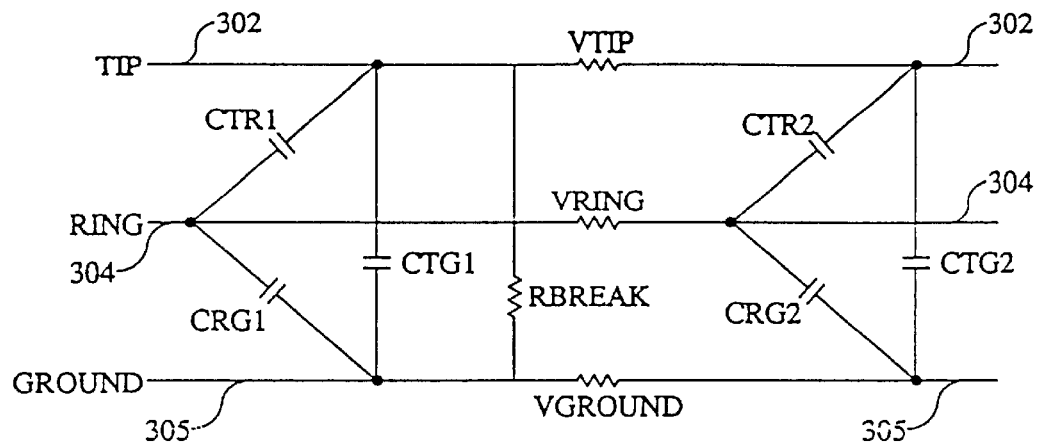
FIG. 17 is an electrical schematic representation of a parallel line fault extending from the tip leg to the line pair ground.
Figure 18:
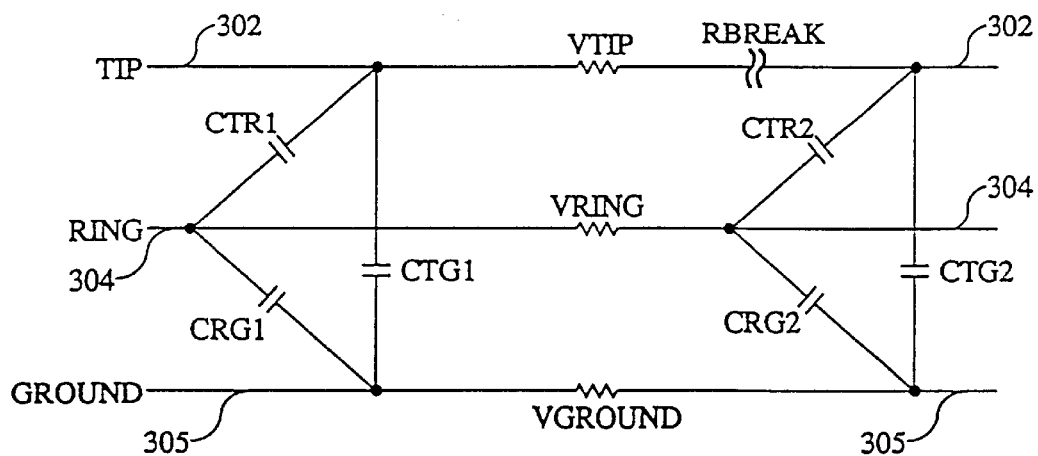
FIG. 18 is an electrical schematic representation of a series line fault in the tip leg of the line pair.

When a craftsperson is taking measurements of a line pair, the craftsperson is typically attempting to determine and locate the existence of a line pair fault. Referring to FIGS. 17 and 18, a line pair fault is represented by the value $R_{break}$. The positions of $R_{break}$ shown is provided for illustrative purposes only and could exist elsewhere in the line pair. A conventional two-terminal measurement is ineffective at locating such a fault because the value of $C_{RG}$ capacitance is the sum of $C_{RG1}$, $C_{TG2}$, and $C_{RG2}$-in other words, an inaccurate measurement is obtained with a two terminal measurement. The values of the remaining capacitance measurements of capacitances $C_{TG}$ and $C_{RG}$ are also flawed because these values would be valid only up to the fault location.

1. Series or Parallel Model Determination

To perform a fault analysis, the three terminal connection illustrated in FIGS. 14 and 15 is made through the test lead connectors 14, 15 and 18. Data is received by the analyzer 10 in the form of reflected analog waveforms propagated. The reflected waveforms are received by the meters $M_1$ and $M_2$ which comprise the meter/waveform circuit 104, the impedance measurement circuit 206 and the DC voltage measurement circuit 202. The meter/waveform circuit 104 processes the reflected waveforms into digital data stored in the SRAM U6L and U6U. The program executed on the microcontroller U10 determines which mathematical analysis to implement: either (1) a series impedance model or (2) a parallel impedance model. A line pair exhibits both series and parallel elements. If the resistance in the line pair is larger, then the model that best approximates the line pair is the series model. Frequency stability analysis is then performed on this model. If the selected model remains relatively stable at another frequency, then this indicates the existence of a short and therefore the parallel model best approximates the line pair, else the series model best approximates the line pair. In the event the line pair is affected by corrosive effects, the situation arises where a malfunctioning line pair still provides operational characteristics. Typically this situation arises when the value of $R_{break}$ is smaller than the leg's resistance which is typically about 50 ohms. Nevertheless, the analyzer 10 can determine that the $R_{break}$ resistance, due to corrosion or a break, exists, thereby conveying to the craftsperson that a high series resistance exists in the leg although the capacitance measurements indicate the line pair is complete all the way through the line pair. That is, that there is an error in the line pair, but it is not known where the fault lies.

2. Line Split Detection & Location

Shown in FIG. 16 is a representation of a split in a line pair caused by an improper splice. Commonly, in industry, cable installers mark where splices are made in a line pair for latter reference. However, if there is an error resulting in a split situation, the craftsperson needs to know which split to go to.

Such splits are electrically detectable due to the decrease in capacitance $C_{TG}$ across the measured line pair and the increase in the capacitances to ground, $C_{TG}$ and $C_{RG}$. Another indicator of a split is a failed longitudinal balance test where the two legs are not equivalent to each other, described in detail above. The discrepancy in characteristics can be measured when acquiring the line pair characteristics through the apparatus and method described earlier. More commonly, a split is detected due to a malfunction in a telephone subscriber's service.

The new method to locate the position of the split takes into account the capacitance values from the tip-to-ring designated as C1 and C2 of the first line pair and the capacitance values from the tip-to-ring designated as C3 and C4 of the second line pair by paralleling the two pairs to generate a single cable length to obtain an overall capacitance value. The two line pair lengths need not be of uniform length. Prior measurement devices required that the two line pairs be absolutely identical in length before being able to accurately diagnose where the split lies. Typically this preparation work is tedious operation because the craftsperson is required to estimate what the lengths of the buried lines are before and after cutting them to length.

A first measurement is taken with the two line pairs in a parallel configuration, causing the two line pairs to appear as a single length of cable to the analyzer 10. Referring to FIG. 8A, shown are the connector J1 having terminals 1, 2, 4, 5 and connector J2 having terminals 28 and 30. Referring to FIG. 16, the near end of the first line pair, having wires TIP 302 and RING 304, respectively, is electrically connected to the meter/waveform circuit 104, discussed above in detail, of the analyzer 10. The second line pair TIP1 and RING1 legs 298 and 300, which is incorrectly spliced with the first line pair to cause a split, provides the signal lines TIP and RING legs 302 and 304 through the connector J1 socket 4 and the J1 connector socket 5 shown in FIG. 7A Internal to the line pair analyzer 10, line signals RING 304 and RING1 300 are bridged together and TIP 302 and TIP1 298 are bridged together through activating relays K31 and K32 to "set," creating a parallel configuration with each other.

A three-terminal measurement is taken of the parallel configuration using the multi-frequency waveform method disclosed earlier. Because the parallel configuration appears as a single length the analyzer 10 can obtain the total capacitance value $C_{TR}$ which is the sum of capacitances C1, C2, C3 and C4. The combined length of the two line pairs can be determined by multiplying the capacitance $C_{TR}$ value obtained times the mutual capacitance of the cable, which under the national standard used in the United States of America is 0.083 microfarads per mile. After the value is obtained, the bridge connections between lines RING 304 and RING1 300 is released, as with the bridge connection between lines TIP 302 and TIP1 304.

The second measurement is taken by shorting the second length RING1 300 and TIP1 298 terminals within the analyzer 10 to the ground plane 226 to cancel the effect of capacitances C2, C3 and C4. The remaining capacitance, C1, is the capacitance value from the near end of the RING 304 to TIP 302 signals to the unsplit portion of the line pair. A three-terminal measurement is taken of this configuration using the multi-frequency waveform method disclosed earlier. The value of C1 is obtained from this measurement. She length to the split is calculated by the formula:

$$\text{Length}_{split} = (\text{Length}/C_{TR})(C1)$$

where Length is the length as determined by the initial measurement to the split, $C_{TR}$ is the total capacitance of the parallel configuration and C1 is the capacitance value as determined by the second stage of the measurements. This length to the first split is valid even if subsequent splits within the same two pairs are present.

Conventionally, a Time Domain Reflectometer (TDR) is used to indicate the location of a split due to the change in impedance, but this device has difficulty with analysis in the presence of line branches, multiple spiced lines, water in the line, and in-line inductors (load coils). In analyzing a multiple spliced line, a TDR will reflect a pulse at every splice to indicate a false image, even if there is not a split. Water in the line pair will cause the TDR to show an attenuation at these points due to the dielectric value of water as measured with the surrounding line pair, providing another false image. In-line inductors act as high-impedance barriers to high frequency signals (in the order of 100 nanoseconds) by the TDR. These physical limitations can inhibit the effectiveness of a TDR for split detection.

Even though numerous characteristics and advantages of the present invention have been set forth in the foregoing description, it is to be understood that together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A telephone line pair interface circuit comprising:

at least two connection terminals;

a plurality of multiple contact switching relays, each of said relays having a first and a second contact connection condition and at least one activating element controllable by a microcomputer having electronic memory means for changing said relay between said first and said second contact connection conditions;

a capacitor;

means incorporating said capacitor for snubbing inductive residuals from the line pair;

means incorporating said capacitor for monitoring an electrical signal flow on telephone line pair before disrupting the signal flow;

means incorporating said capacitor for detecting a telephone ring signal; and means for simulating a large inductance to carry loop current from the line pair once a communication connection is established on the opposite end of the telephone line pair, wherein said connection terminals, said snubbing means, said monitoring means, said ring signal detecting means and said simulated inductance means are so arranged constructed and interconnected as to selectably provide a predetermined selection of any of said means electrically connected to said connection terminals in dependence upon the contact connection conditions of said plurality of relays.

2. A telephone line pair interface circuit as defined in claim 1 wherein said capacitor is a 250-volt polypropylene capacitor.

3. A telephone line pair interface circuit as defined in claim 1 wherein the predetermined selection further comprises selectably bypassing said snubbing means with said plurality of multiple contact switching relays.

4. A telephone line pair interface circuit as defined in claim 1 wherein said detecting means further comprise:

a transformer having a primary winding with a first and a second terminal and a secondary winding with a first and a second terminal;

a resistor electrically connected in series between the first terminal of the primary winding terminal of said transformer and said capacitor;

a means for indicating the presence of a ring signal having a predetermined voltage electrically connected to a second terminal of the primary winding terminal of said transformer, said indicating means energizing when the ring signal is present and placing a voltage on the first terminal of the secondary winding; and detecting means electrically connected to the first terminal of the secondary winding responsive to the voltage placed on the first terminal of the secondary winding to announce the presence of a ring signal.

5. A telephone line pair interface circuit as defined in claim 1 wherein said indicating means comprise:

an optoisolator having a transistor portion and a diode portion, said transistor portion having a collector terminal electrically connected to a biasing low voltage source and an emitter terminal electrically connected to said detecting means; and a threshold voltage circuit comprising a first and a second zener diode, each said zener diode having a cathode terminal and an anode terminal, the cathode terminal of the first zener diode is electrically connected to the first connection terminal and the anode terminal of the first zener diode is electrically connected to the anode terminal of the second zener diode, the cathode terminal of the second zener diode is electrically connected through a resistor to a cathode terminal of the diode portion of said optoisolator, an anode terminal of the diode portion of the optoisolator is electrically connected to the first terminal of the primary winding of said transformer.

6. A telephone line pair interface circuit as defined in claim 1 wherein said inductor simulating means comprises:

a rectifier bridge having two input terminals and two output terminals;

a first balancing resistor;

a second balancing resistor;

a darlington transistor having a base terminal, a collector terminal and an emitter terminal, the base terminal connected through both said first balancing resistor to the first output terminal of said rectifier bridge and said second balancing resistor to the second output terminal of said rectifier bridge, and the emitter terminal of said darlington transistor is electrically connected through a current limiting resistor to the first terminal of said rectifier bridge, and the collector terminal is electrically connected through an over-voltage protection means to the emitter terminal of said darlington transistor, and the collector terminal of said darlington transistor is electrically connected through a heat dissipation resistor to the second output terminal of said rectifier bridge; and a capacitor electrically connected with the base terminal of said darlington transistor and shunted with said first balancing resistor to provide a biasing voltage across the emitter terminal and the base terminal of said darlington transistor.

7. A telephone line pair interface circuit as defined in claim 3 wherein said snubbing means further comprises:

a series resistor having a first terminal electrically connected to said capacitor and a second terminal electrically connected to the second terminal of the primary winding of said transformer.

* * * * *